(12) United States Patent
Yamamoto et al.

(10) Patent No.: US 6,950,039 B2
(45) Date of Patent: Sep. 27, 2005

(54) INFORMATION ENCODING APPARATUS, INFORMATION ENCODING METHOD, INFORMATION RE-ENCODING APPARATUS AND INFORMATION RE-ENCODING METHOD

(75) Inventors: Yoshikazu Yamamoto, Osaka (JP); Hisae Tanaka, Osaka (JP); Motoshi Ito, Osaka (JP)

(73) Assignee: Matsushita Electric Industrial Co., Ltd., Kadoma (KR)

( * ) Notice: Subject to any disclaimer, the term of this patent is extended or adjusted under 35 U.S.C. 154(b) by 25 days.

(21) Appl. No.: 10/798,846

(22) Filed: Mar. 11, 2004

(65) Prior Publication Data

US 2004/0201504 A1 Oct. 14, 2004

(30) Foreign Application Priority Data

Apr. 10, 2003 (JP) ...................................... 2003-106390

(51) Int. Cl.[7] ............................................... H03M 7/00
(52) U.S. Cl. ........................... 341/50; 714/769; 341/58; 369/59.24
(58) Field of Search ..................... 369/59.24, 275.3; 341/58, 50; 360/73.06; 705/57; 375/368

(56) References Cited

U.S. PATENT DOCUMENTS

| | | | | |
|---|---|---|---|---|
| 5,499,148 A | * | 3/1996 | Kubota et al. | 360/73.06 |
| 5,901,127 A | * | 5/1999 | Sako et al. | 369/59.24 |
| 5,930,367 A | * | 7/1999 | Osawa et al. | 705/57 |
| 6,005,839 A | * | 12/1999 | Sako et al. | 369/275.3 |
| 6,141,787 A | * | 10/2000 | Kunisa et al. | 714/769 |
| 6,377,643 B1 | * | 4/2002 | Lee et al. | 375/368 |

FOREIGN PATENT DOCUMENTS

JP 2000-306342 11/2000

OTHER PUBLICATIONS

Coakeley et al. (U.S. Appl. No. 10/117,208), "Systems and methods for high speed serial encoding and decoding for data and control interfaces", filed on Apr. 8, 2002.*

* cited by examiner

Primary Examiner—Jean Bruner Jeanglaude
(74) Attorney, Agent, or Firm—Renner, Otto, Boisselle & Sklar, LLP

(57) ABSTRACT

An information encoding apparatus for encoding N pieces of information, the information encoding apparatus includes a scrambling pattern generation section for generating M scrambling patterns (N>M≧1; where M and N are each an integer); a scrambled information generation section for applying, to each of the N pieces of information, one corresponding scrambling pattern among the M scrambling patterns so as to generate N pieces of scrambled information; and an encoded information generation section for supplying the N pieces of scrambled information with N parities, respectively, so as to generate encoded information. Each of at least one of the M scrambling patterns is applied to two or more of the N pieces of information.

30 Claims, 19 Drawing Sheets

US 6,950,039 B2

INFORMATION ENCODING APPARATUS, INFORMATION ENCODING METHOD, INFORMATION RE-ENCODING APPARATUS AND INFORMATION RE-ENCODING METHOD

This non-provisional application claims priority under 35 U.S.C., § 119(a), on patent application No. 2003-106390 filed in Japan on Apr. 10, 2003, the entire contents of which are hereby incorporated by reference.

BACKGROUND OF THE INVENTION

1. Field of the Invention

The present invention relates to an information encoding apparatus and method for encoding a plurality of pieces of information, and an information re-encoding apparatus and method for re-encoding a plurality of pieces of first encoded information into a plurality of pieces of second encoded information.

2. Description of the Related Art

Recently, a storage capacity of optical discs (e.g., DVDs (Digital Versatile Discs)) and optomagnetic discs is increased, and the optical discs and the optomagnetic discs are used for recording moving pictures or the like.

FIG. 17 shows a conventional information encoding apparatus 1500.

The information encoding apparatus 1500 includes a storage section 1501, a scrambling section 1502 and a parity generation section 1503. The information encoding apparatus 1500 is included in, for example, an optical disc recording and reproduction apparatus for encoding a plurality of pieces of information.

The storage section 1501 stores a plurality of pieces of information.

The scrambling section 1502 scrambles the plurality of pieces of information. The plurality of pieces of information are scrambled in order to provide the optical disc recording and reproduction apparatus, for reproducing the plurality of pieces of information, with stable tracking servo control. The plurality of pieces of information are scrambled by adding a random data stream (hereinafter, referred to as a "scrambling pattern") to the information.

For example, an optical disc has a plurality of tracks formed therein. Information is recorded on the plurality of tracks. A scrambling pattern to be added to the information at a prescribed position on a track is different from a scrambling pattern to be added to the information at a different position on the track. In general, different scrambling patterns are used for information of different error correction units.

The parity generation section 1503 generates a plurality of parities in correspondence with the plurality of pieces of scrambled information.

The plurality of pieces of scrambled information are respectively supplied with the plurality of parities, so that encoded information is generated.

The encoded information is recorded on a recording medium such as an optical disc or the like.

In the case where the information cannot be recorded at a prescribed position on the track due to a defect at that position, the information is recorded at a different position on the track. When the information is recorded at a different position, the scrambling pattern to be added to the informa-tion needs to be changed. Accordingly, the information needs to be re-encoded.

FIG. 18 illustrates re-encoding of information.

Hereinafter, a procedure for generating a plurality of pieces of information scrambled with a plurality of scrambling patterns C by re-encoding a plurality of pieces of information scrambled with a plurality of scrambling patterns B by the information encoding apparatus 1500.

The scrambling section 1502 de-scrambles the encoded information stored in the storage section 1501. For example, de-scrambling is an operation for returning scrambled information into the non-scrambled information. De-scrambling, similar to scrambling, is performed by adding a scrambling pattern to the scrambled information. For example, non-scrambled information is generated by adding a scrambling pattern B to the information scrambled with the scrambling pattern B.

The scrambling section 1502 generates information scrambled with a scrambling pattern C by adding the scrambling pattern C to non-scrambled information.

The parity generation section 1503 generates parities. The parity generation section 1503 generates re-encoded information by supplying information scrambled with the scrambling pattern C with a parity.

Re-encoding information using the information encoding apparatus 1500 is time-consuming. For example, for performing real-time recording of a moving picture, the recording rate is significantly reduced.

It has been proposed to reduce the information re-encoding time by dividing encoded information into a portion relying on the information to be recorded on a recording medium and a portion relying on the position on the recording medium at which the information is to be recorded, processing these portions, and adding these portions together when recording these portions on the recording medium (for example, Japanese Laid-Open Publication No. 2000-306342).

FIG. 19 shows a structure of an information re-encoding apparatus 1700 described in Japanese Laid-Open Publication No. 2000-306342.

The information re-encoding apparatus 1700 includes a first storage section 1701, a first parity generation section 1702, a pattern generation section 1703, a second storage section 1704, a second parity generation section 1705, and an addition section 1706.

The first storage section 1701 has a plurality of pieces of information stored thereon. The first parity generation section 1702 generates a plurality of first parities in correspondence with the plurality of pieces of information.

The plurality of pieces of information are respectively supplied with the plurality of first parities, so that a plurality of pieces of error correction encoded information are generated. The plurality of pieces of error correction encoded information are stored in the first storage section 1701.

The pattern generation section 1703 generates a plurality of scrambling patterns. The plurality of scrambling patterns are stored in the second storage section 1704.

The second parity generation section 1705 generates a plurality of second parities in correspondence with the plurality of scrambling patterns.

The plurality of scrambling patterns are respectively supplied with the plurality of second parities, so that a plurality of pieces of error correction encoded scrambling patterns are generated. The plurality of error correction encoded scrambling patterns are stored in the second storage section 1704.

The addition section 1706 generates encoded information by adding the plurality of pieces of error correction encoded information and the plurality of error correction encoded scrambling patterns. The encoded information is stored in a recording medium (not shown).

The above-described apparatuses have the following problems.

(1) The method of scrambling information to be recorded sector by sector of the recording medium is time-consuming.

(2) In the case where the information re-encoding time is reduced by dividing encoded information into a portion relying on the information to be recorded on a recording medium and a portion relying on the position on the recording medium at which the information is to be recorded, processing these portions, and adding these portions together when recording these portions on the recording medium, an additional storage section for temporarily storing the portion of the encoded information relying on the position on the recording medium at which the information is to be recorded is required.

(3) In the case where the information cannot be recorded at a prescribed position on the track and is recorded at a position which is not adjacent to the prescribed position, time is required for re-encoding the portion of the information relying on the position on the recording medium at which the information is to be recorded so that the information is recordable at a position which is not adjacent to the prescribed position.

SUMMARY OF THE INVENTION

According to one aspect of the invention, an information encoding apparatus for encoding N pieces of information is provided. The information encoding apparatus includes a scrambling pattern generation section for generating M scrambling patterns ($N>M \geq 1$; where M and N are each an integer); a scrambled information generation section for applying, to each of the N pieces of information, one corresponding scrambling pattern among the M scrambling patterns so as to generate N pieces of scrambled information; and an encoded information generation section for supplying the N pieces of scrambled information with N parities, respectively, so as to generate encoded information. Each of at least one of the M scrambling patterns is applied to two or more of the N pieces of information.

In one embodiment of the invention, the M is a divisor of N, and the scrambling information generation section applies one corresponding scrambling pattern among the M scrambling patterns to each of the N pieces of information such that the M scrambling patterns are repeated N/M times, so as to generate the N pieces of scrambled information.

In one embodiment of the invention, the information encoding apparatus further includes a first storage section for storing the N pieces of scrambled information and the N parities in order to supply the N pieces of scrambled information with the N parities.

In one embodiment of the invention, the information encoding apparatus further includes a second storage section for storing the M scrambling patterns.

In one embodiment of the invention, the encoded information generation section is a division circuit.

In one embodiment of the invention, the encoded information generation section generates the N parities by erasure correction.

In one embodiment of the invention, N is 32 and M is 1.

According to another aspect of the invention, an information encoding method for encoding N pieces of information is provided. The information encoding method includes the steps of (a) generating M scrambling patterns ($N>M \geq 1$; where M and N are each an integer); (b) applying, to each of the N pieces of information, one corresponding scrambling pattern among the M scrambling patterns, thereby generating N pieces of scrambled information; and (c) supplying the N pieces of scrambled information with N parities, respectively, thereby generating encoded information. Each of at least one of the M scrambling patterns is applied to two or more of the N pieces of information.

In one embodiment of the invention, the M is a divisor of N, and step (b) includes the step of applying one corresponding scrambling pattern among the M scrambling patterns to each of the N pieces of information such that the M scrambling patterns are repeated N/M times, thereby generating the N pieces of scrambled information.

In one embodiment of the invention, the information encoding method further includes the step of storing the N pieces of scrambled information and the N parities in order to supply the N pieces of scrambled information with the N parities.

In one embodiment of the invention, the information encoding method further includes the step of storing the M scrambling patterns.

In one embodiment of the invention, step (c) includes the step of generating the N parities by division operation.

In one embodiment of the invention, step (c) includes the step of generating the N parities by erasure correction.

In one embodiment of the invention, N is 32 and M is 1.

According to still another aspect of the invention, the information re-encoding apparatus for re-encoding a plurality of pieces of first encoded information into a plurality of pieces of second encoded information is provided. The plurality of pieces of first encoded information include a plurality of first scrambled information scrambled by performing an arithmetic operation on a plurality of first scrambling patterns with respect to a plurality of pieces of information by a first method. The plurality of pieces of second encoded information include a plurality of pieces of second scrambled information scrambled by performing an arithmetic operation on a plurality of second scrambling patterns with respect to the plurality of pieces of information by the first method, and a plurality of second parities. The information re-encoding apparatus includes a third scrambling pattern generation section for performing an arithmetic operation on the plurality of first scrambling patterns with respect to the plurality of second scrambling patterns by a second method, so as to generate a plurality of third scrambling patterns; a scrambled information generation section for performing an arithmetic operation on the plurality of third scrambling patterns with respect to the plurality of pieces of first scrambled information by the first method, so as to generate the plurality of pieces of second scrambled information; and an encoded information generation section for supplying the plurality of pieces of second scrambled information with the plurality of second parities, so as to generate the plurality of pieces of second encoded information. The arithmetic operations performed by the first method and the second method fulfill $(A \circ B) \bullet B = A$, where $\circ$ represents a first operator representing the arithmetic operation to be performed by the first method, the $\bullet$ represents a second operator representing the arithmetic operation to be performed by the second method, and A and B each represent an arbitrary value.

In one embodiment of the invention, the information re-encoding apparatus further includes a first storage section for storing the plurality of pieces of second scrambled information and the plurality of second parities in order to supply the plurality of pieces of second scrambled information with the plurality of second parities.

In one embodiment of the invention, the information re-encoding apparatus further includes a second storage section for storing the plurality of third scrambling patterns and the plurality of third parities.

In one embodiment of the invention, the plurality of pieces of first encoded information include a plurality of first parities. The encoded information generation section includes a third parity generation section for generating a plurality of third parities in correspondence with the plurality of third scrambling patterns; and a second parity generation section for performing an arithmetic operation on the plurality of third parities with respect to the plurality of first parities by the first method, so as to generate the plurality of second parities.

In one embodiment of the invention, the third parity generation section is a division circuit.

In one embodiment of the invention, the third parity generation section generates the plurality of third parities by erasure correction.

In one embodiment of the invention, the plurality of pieces of first scrambled information are N pieces of information, the plurality of third scrambling patterns are M pieces of information (N>M≧1; M and N are each an integer; and M is a divisor of N), the plurality of first parities are N pieces of information, and the plurality of third parities are M pieces of information. The scrambled information generation section performs an arithmetic operation on one corresponding third scrambling pattern among the plurality of third scrambling patterns with respect to each of the plurality of pieces of first scrambled information by the first method, such that the plurality of third scrambling patterns are repeated N/M times, so as to generate N pieces of second scrambled information. The second parity generation section performs an arithmetic operation on one corresponding third parity among the plurality of third parities with respect to each of the plurality of first parities by the first method, such that the plurality of third parities are repeated N/M times, so as to generate N pieces of second parities.

In one embodiment of the invention, N is 32 and M is 2.

According to still another aspect of the invention, an information re-encoding method for re-encoding a plurality of pieces of first encoded information into a plurality of pieces of second encoded information is provided. The plurality of pieces of first encoded information include a plurality of first scrambled information scrambled by performing an arithmetic operation on a plurality of first scrambling patterns with respect to a plurality of pieces of information by a first method. The plurality of pieces of second encoded information include a plurality of pieces of second scrambled information scrambled by performing an arithmetic operation on a plurality of second scrambling patterns with respect to the plurality of pieces of information by the first method, and a plurality of second parities. The information re-encoding method includes the steps of (a) performing an arithmetic operation on the plurality of first scrambling patterns with respect to the plurality of second scrambling patterns by a second method, thereby generating a plurality of third scrambling patterns; (b) performing an arithmetic operation on the plurality of third scrambling patterns with respect to the plurality of pieces of first scrambled information by the first method, thereby generating the plurality of pieces of second scrambled information; and (c) supplying the plurality of pieces of second scrambled information with the plurality of second parities, thereby generating the plurality of pieces of second encoded information. The arithmetic operations performed by the first method and the second method fulfill $(A \circ B) \bullet B = A$, where $\circ$ represents a first operator representing the arithmetic operation to be performed by the first method, the $\bullet$ represents a second operator representing the arithmetic operation to be performed by the second method, and A and B each represent an arbitrary value.

In one embodiment of the invention, the information re-encoding method further includes the step of storing the plurality of pieces of second scrambled information and the plurality of second parities in order to supply the plurality of pieces of second scrambled information with the plurality of second parities.

In one embodiment of the invention, the information re-encoding method further includes the step of storing the plurality of third scrambling patterns and the plurality of third parities.

In one embodiment of the invention, the plurality of pieces of first encoded information include a plurality of first parities. Step (c) includes the steps of (c-1) generating a plurality of third parities in correspondence with the plurality of third scrambling patterns; and (c-2) performing an arithmetic operation on the plurality of third parities with respect to the plurality of first parities by the first method, thereby generating the plurality of second parities.

In one embodiment of the invention, step (c-1) includes the step of generating the plurality of third parities by division operation.

In one embodiment of the invention, step (c-1) includes the step of generating the plurality of third parities by erasure correction.

In one embodiment of the invention, the plurality of pieces of first scrambled information are N pieces of information, the plurality of third scrambling patterns are M pieces of information (N>M≧1; M and N are each an integer; and M is a divisor of N), the plurality of first parities are N pieces of information, and the plurality of third parities are M pieces of information. Step (b) includes the step of performing an arithmetic operation on one corresponding third scrambling pattern among the plurality of third scrambling patterns with respect to each of the plurality of pieces of first scrambled information by the first method, such that the plurality of third scrambling patterns are repeated N/M times, thereby generating N pieces of second scrambled information; and step (c-2) includes the step of performing an arithmetic operation on one corresponding third parity among the plurality of third parities with respect to each of the plurality of first parities by the first method, such that the plurality of third parities are repeated N/M times, thereby generating N pieces of second parities.

In one embodiment of the invention, N is 32 and M is 2.

Thus, the invention described herein makes possible the advantages of providing an information encoding apparatus and method for shortening the time required for generating a scrambling pattern by reducing the number of times that the scrambling pattern is to be generated and also for reducing a capacity of the storage section which is temporarily used; and an information re-encoding apparatus and method for reducing the time required for generating a plurality of pieces of second information from a plurality of pieces of first information and also for reducing a capacity of the storage section which is temporarily used.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

The error correction code used in first through fourth examples of the present invention is a Read-Solomon code RS (248, 216) over an extension field obtained from a prime field GF (2) by adjoining a root α of the primitive polynomial (expression 1). Here, the number of error correction codes in one unit is 304.

$$x^8+x^4+X^3+x^2+1=0 \qquad \text{Expression 1}$$

Figure 1:
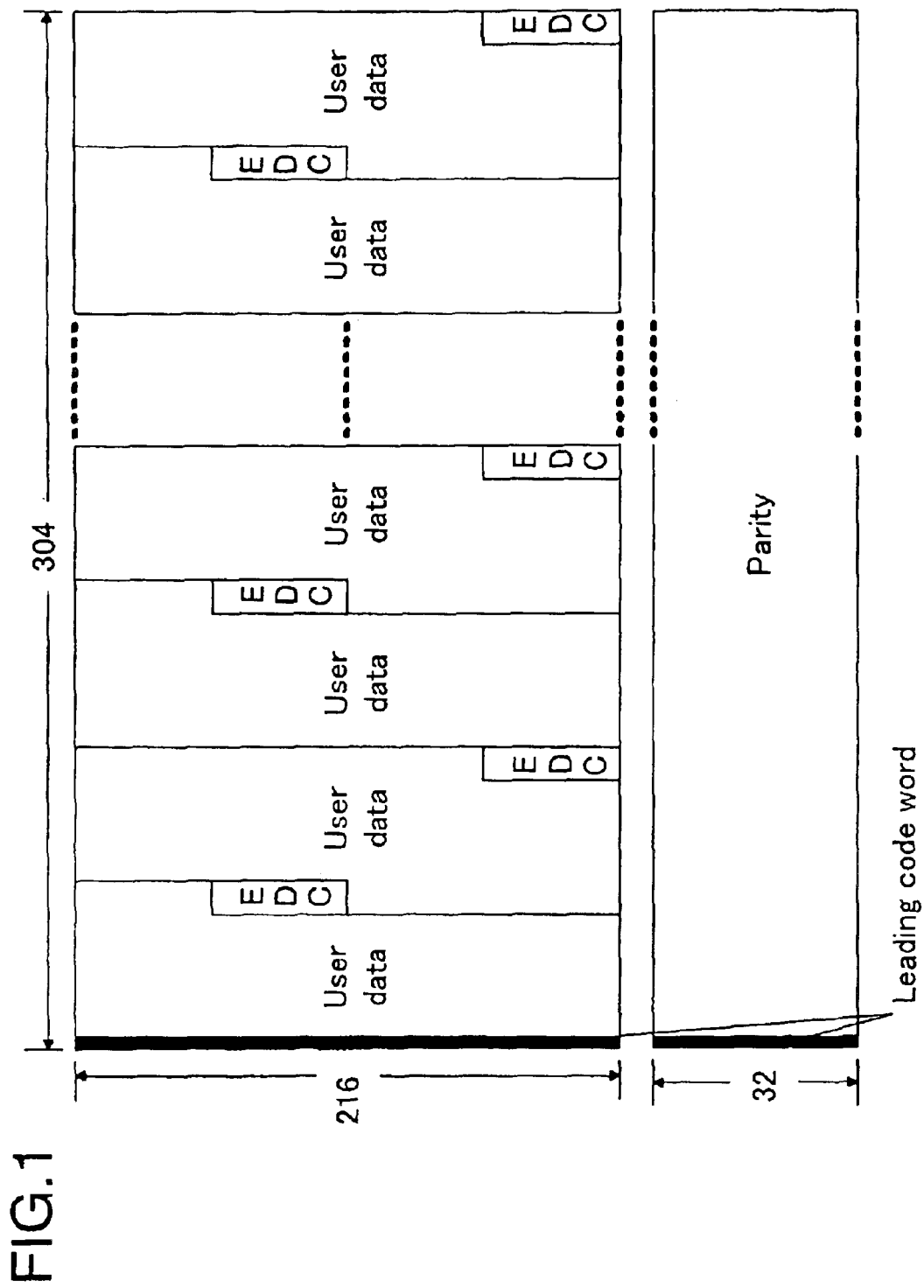
FIG. 1 shows an error correction format used in examples of the present invention.

FIG. 1 shows an error correction code format used in the first through fourth examples of the present invention.

The number of sectors for error correction codes in one unit is 32. User data 0 and error detection code EDC0 are included in one sector. Similarly, user data 1 and error detection code EDC1 are included in one sector, and user data 2 and error detection code EDC2 are included in one sector, etc. User data 31 and error detection code EDC31 are included in one sector.

Figure 2:
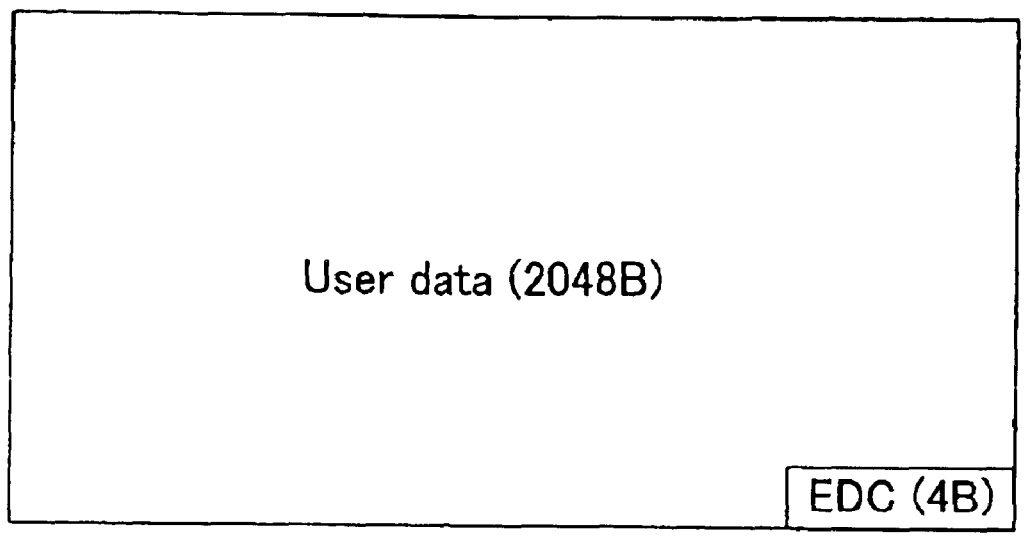
FIG. 2 shows a sector format.

FIG. 2 shows a sector format.

One sector includes user data and an error detection code. User data is, for example, 2048-byte data for a moving picture. An error detection code (EDC) is for detecting an erroneous error correction at the time of data reproduction, and is 4-byte data. The error detection code is calculated based on each of the coefficients of a polynomial a (x) obtained from expression 2.

$$a(x) \cdot x^{32} \bmod x^{32}+x^{31}+x^4+1 \qquad \text{Expression 2}$$

EXAMPLE 1

Figure 3:
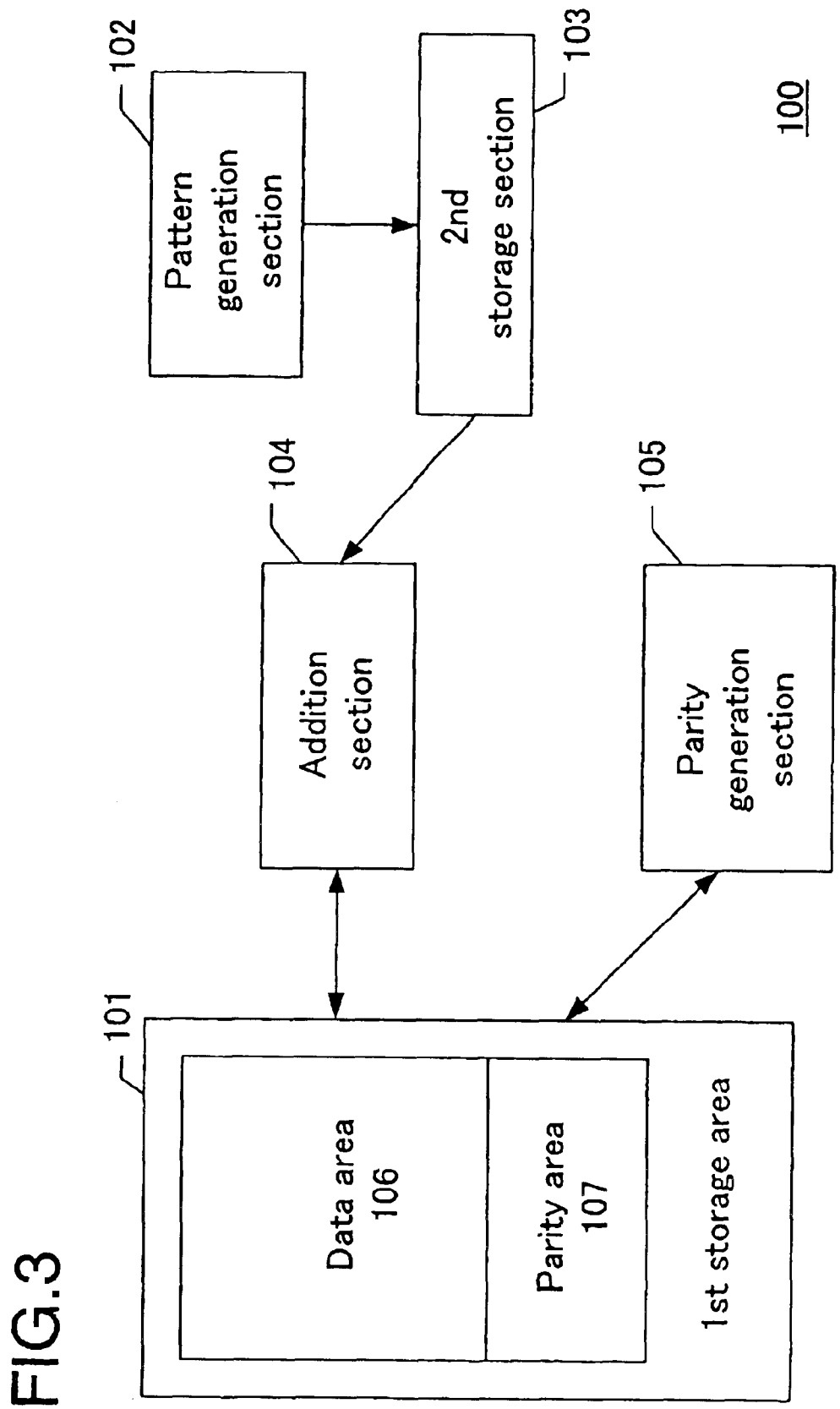
FIG. 3 shows a structure of an information encoding apparatus 100 according to a first example of the present invention.

FIG. 3 shows a structure of an information encoding apparatus 100 according to the first example of the present invention.

The information encoding apparatus 100 includes a first storage section 101, a pattern generation section 102, a second storage section 103, an addition section 104, and a parity generation section 105.

The first storage section 101 stores scrambled information and a parity in order to supply the scrambled information with the parity.

The first storage section 101 includes a data area 106 and a parity area 107.

In the data area 106, scrambled data (scrambled information), data to be encoded (information to be encoded), or encoded data (encoded information) is to be stored.

In the parity area 107, parities are to be stored.

The pattern generation section 102 generates M pieces of (M periods of) scrambling patterns. The number of scrambling patterns (number of periods of scrambling patterns) generated by the pattern generation section 102 is less than the number (N) of pieces of information to be encoded (N>M≧1; where M and N are each an integer). The pattern generation section 102 outputs M scrambling patterns to the second storage section 103. The pattern generation section 102 will be described below in more detail.

The second storage section 103 stores scrambling patterns.

The addition section 104 applies, to each of the N pieces of information to be encoded, one corresponding scrambling pattern among the M scrambling patterns, so as to generate N pieces of scrambled information. Each of at least one of the M scrambling patterns is applied to two or more of the N pieces of information. The N pieces of scrambled information are stored in the data area 106.

The parity generation section 105 generates N parities in correspondence with the N pieces of scrambled information. The generation section 105 will be described below in more detail.

For example, M scrambling patterns are M sectors of scrambling patterns. N pieces of information are N sectors of information.

Figure 4:
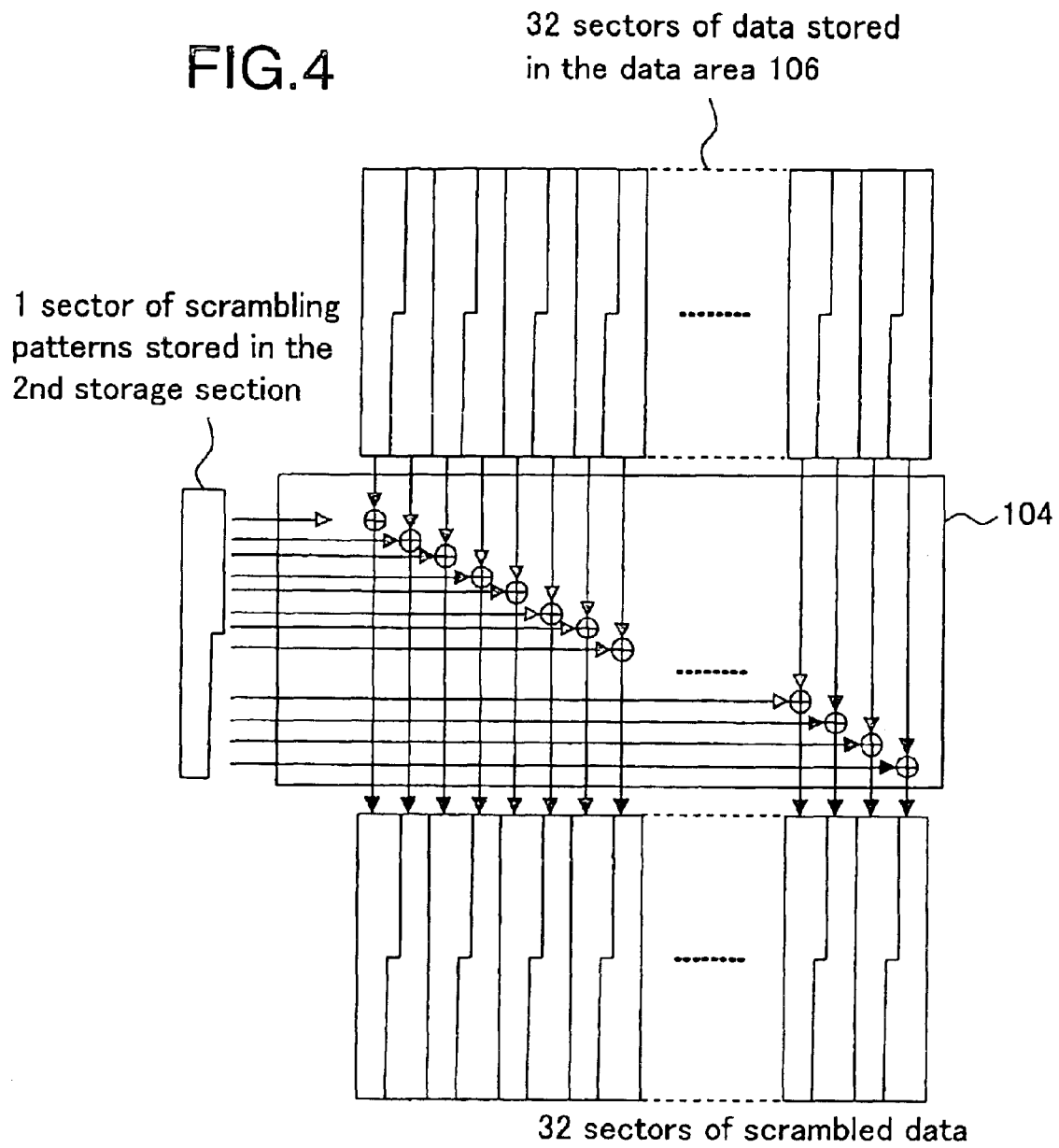
FIG. 4 shows an example in which an addition section 104 adds scrambling patterns to a plurality of pieces of information.

FIG. 4 shows an example in which the addition section 104 adds scrambling patterns to a plurality of pieces of information.

The addition section 104 adds one sector of scrambling patterns stored in the second storage section 103 and the first sector information among 32 sectors of data stored in the data area 106, so as to generate one sector of scrambled information. The addition section 104 adds one sector of scrambling patterns stored in the second storage section 103 and the second sector information among 32 sectors of data stored in the data area 106, so as to generate one sector of scrambled information.

Thus, the addition section 104 sequentially adds one sector of scrambling patterns stored in the second storage section 103 and each sector information among 32 sectors of data stored in the data area 106, so as to generate 32 sectors of scrambled information. The generated 32 sectors of scrambled information are stored in the data area 106.

Figure 5:
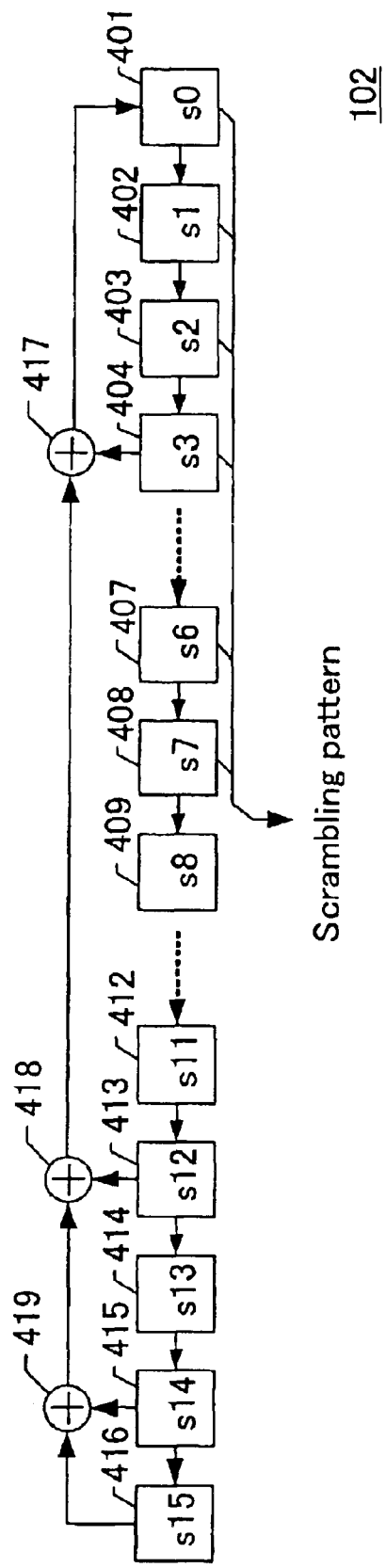
FIG. 5 show a structure of a pattern generation section 102.

FIG. 5 shows a structure of the pattern generation section 102.

The pattern generation section 102 includes 16 memory devices 401 through 416 and three adders 417 through 419.

For generating a scrambling pattern, the species of scrambling is determined in accordance with the position on the recording medium at which the information is to be recorded. For example, specific 16 bits (s15 through s0) of the physical block number are used. By outputting the values of s7 through s0 each time the shift registers are shifted 8 times, 2052-byte scrambling patterns are generated. In a specific example, the stream of the scrambling patterns which is generated when the species of scrambling is C000h (s15 and s14 are 1 and other bits are 0) is 00h, 44h, 46h, 86h, 96h, . . . 38h, 12h, A2h.

Figure 6:
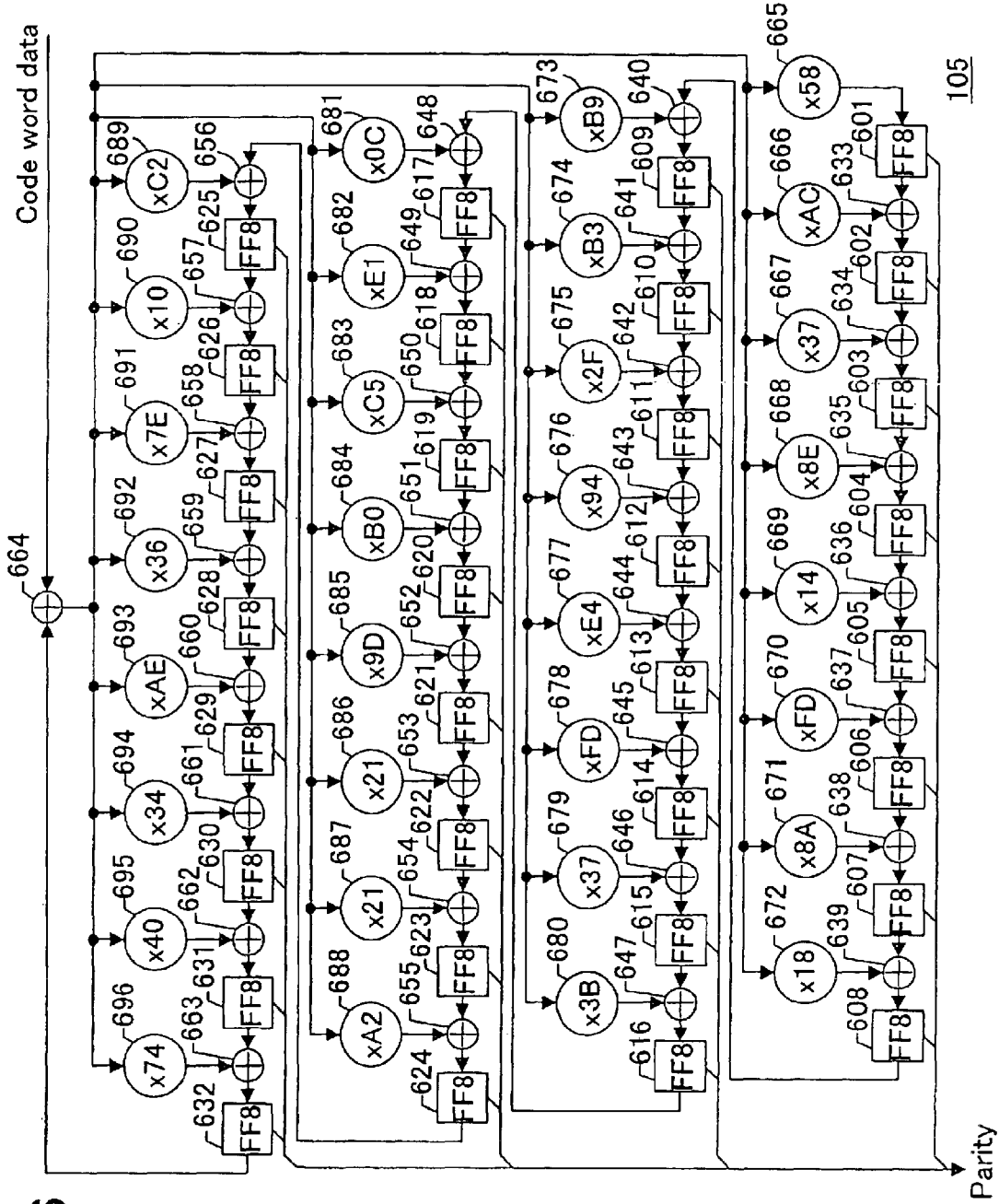
FIG. 6 shows an example of a parity generation section 105.

FIG. 6 shows an example of the parity generation section 105. The parity generation section 105 shown in FIG. 6 is formed of a division circuit.

The parity generation section 105 includes 32 8-bit memory devices 601 through 632, 32 8-bit adders 633 through 664, and 32 coefficient multipliers 665 through 696. The value of the 8-bit memory devices 601 through 632 is initially 00h (cleared state). 216-byte data forming an information section of the code word is sequentially input to the 8-bit memory devices 601 through 632 as code word data. The data stored in the 8-bit memory devices 601 through 632, after the 216-byte data is input to the 8-bit memory devices 601 through 632, is the parity to be calculated. By performing this processing for all 304 code words, 32 sectors of scrambled information are error correction encoded.

Figure 7:
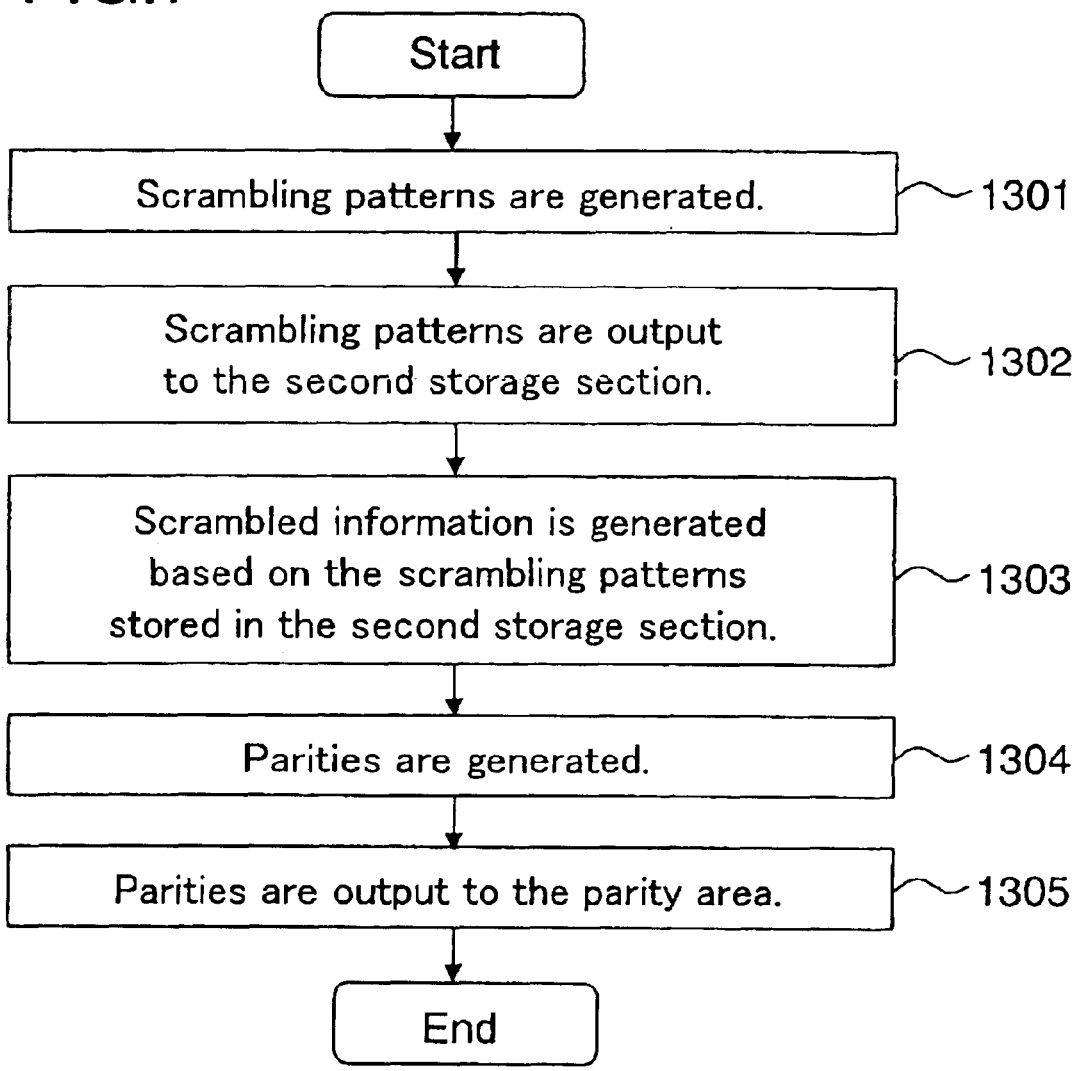
FIG. 7 is a flowchart illustrating a procedure for encoding information by the information encoding apparatus 100.

FIG. 7 shows a procedure for encoding information by the information encoding apparatus 100.

Hereinafter, the procedure will be described step by step.

It is assumed here that the data area 106 has 32 sectors of information to be encoded stored therein.

Step 1301: The pattern generation section 102 generates one sector (one period) of scrambling patterns. For example, the pattern generation section 102 sets the species of scrambling for generating scrambling patterns at s15 through s0. The pattern generation section 102 outputs the value of s7 through s0 each time the shift registers are shifted 8 times, so as to generate one sector of scrambling patterns (2052 bytes).

After this, the processing advances to step 1302.

Step 1302: The pattern generation section 102 outputs one sector of scrambling patterns to the second storage section 103.

After this, the processing advances to step 1303.

Step 1303: The second storage section 103 stores the one sector of scrambling patterns. The addition section 104 adds the one sector of scrambling patterns stored in the second storage section 103 and the first sector information among 32 sectors of data stored in the data area 106, so as to generate one sector of scrambled information. The addition section 104 adds one sector of scrambling patterns stored in the second storage section 103 and the second sector information among 32 sectors of data stored in the data area 106, so as to generate one sector of scrambled information. Thus, the addition section 104 sequentially adds one sector of scrambling patterns stored in the second storage section 103 and each sector information among 32 sectors of data stored in the data area 106, so as to generate 32 sectors of scrambled information. The generated 32 sectors of scrambled information are stored in the data area 106.

After this, the processing advances to step 1304.

Step 1304: The parity generation section 105 generates 32 sectors of parities in correspondence with the 32 sectors of scrambled information stored in the data area 106.

After this, the processing advances to step 1305.

Step 1305: The parity generation section 105 outputs the generated 32 sectors of parities to the parity area 107. Thus, 32 sectors of scrambled information are supplied with 32 sectors of parities, so that encoded information is generated.

Then, the processing is completed.

According to the information encoding apparatus and method of the present invention, one corresponding scrambling pattern among M scrambling patterns is applied to each of N pieces of information (N>M≧1; where M and N are each an integer), so that N pieces of scrambled information are generated. Each of at least one of M scrambling patterns is applied to two or more of the N pieces of information.

Therefore, it is sufficient to generate M scrambling patterns for N pieces of information. It is not necessary to generate N scrambling patterns.

As a result, the number of times that the scrambling patterns need to be generated can be reduced, and thus the time required for generating scrambling patterns can be shortened.

In the first example, error correction codes having an error correction unit of 32 sectors and a sector size of 2052 bytes are used. The pattern generation section 102 generates one sector of scrambling patterns. The type of code used and the number of scrambling patterns generated by the pattern generation section 102 are not limited to the above. The type of code and the number of scrambling patterns generated by the pattern generation section 102 are arbitrary, as long as N pieces of scrambled information are generated by applying to, the N pieces of information, one corresponding scrambling pattern among the M scrambling patterns (N>M≧1; where M and N are each an integer) and each of at least one of the M scrambling patterns is applied to two or more of the N pieces of information.

For example, when M is a divisor of N, the addition section 104 applies one corresponding scrambling pattern among the M scrambling patterns to each of the N pieces of information such that the M scrambling patterns are repeated N/M times, so as to generate N pieces of scrambled information.

One storage section may be divided into a plurality of areas, in which case one of the plurality of areas is used as the first storage section 101 and another one of the plurality of areas is used as the second storage section 103.

In the case where the information encoding apparatus 100 is included in the recording and reproduction apparatus, a section for performing error correction while reproduction may be used as the parity generation section 105 and parities may be generated by performing erasure correction.

In the first example, in order to generate N pieces of scrambled information, the addition section 104 adds each of the N pieces of information and one corresponding scrambling pattern among M scrambling patterns. The form of application is not limited to addition, as long as one corresponding scrambling pattern among M scrambling patterns is applied to each of the N pieces of information for generating N pieces of scrambled information. The form of application may be subtraction. In this case, the information encoding apparatus 100 includes a subtraction section instead of, or in addition to, the addition section 104.

In the example shown in FIG. 3, the pattern generation section 102 acts as the "scrambling pattern generation section for generating M scrambling patterns (N >M≧1; where M and N are each an integer)". The first storage section 101, the second storage section 103, and the addition section 104 together acts as the "scrambled information generation section for applying, to each of the N pieces of information, one corresponding scrambling pattern among the M scrambling patterns so as to generate N pieces of scrambled information". The first storage section 101 and the parity generation section 105 together act as the "encoded information generation section for supplying the N pieces of scrambled information with N parities, respectively, so as to generate encoded information". However, the elements included in the information encoding apparatus according to the present invention are not limited to the above.

The information encoding apparatus according to the present invention may have any structure as long as including elements acting as the "scrambling pattern generation section for generating M scrambling patterns (N>M≧1; where M and N are each an integer)", the "scrambled information generation section for applying, to each of the N pieces of information, one corresponding scrambling pattern among the M scrambling patterns so as to generate N pieces of scrambled information", and the "encoded information generation section for supplying the N pieces of scrambled information with N parities, respectively, so as to generate encoded information".

EXAMPLE 2

Figure 8:
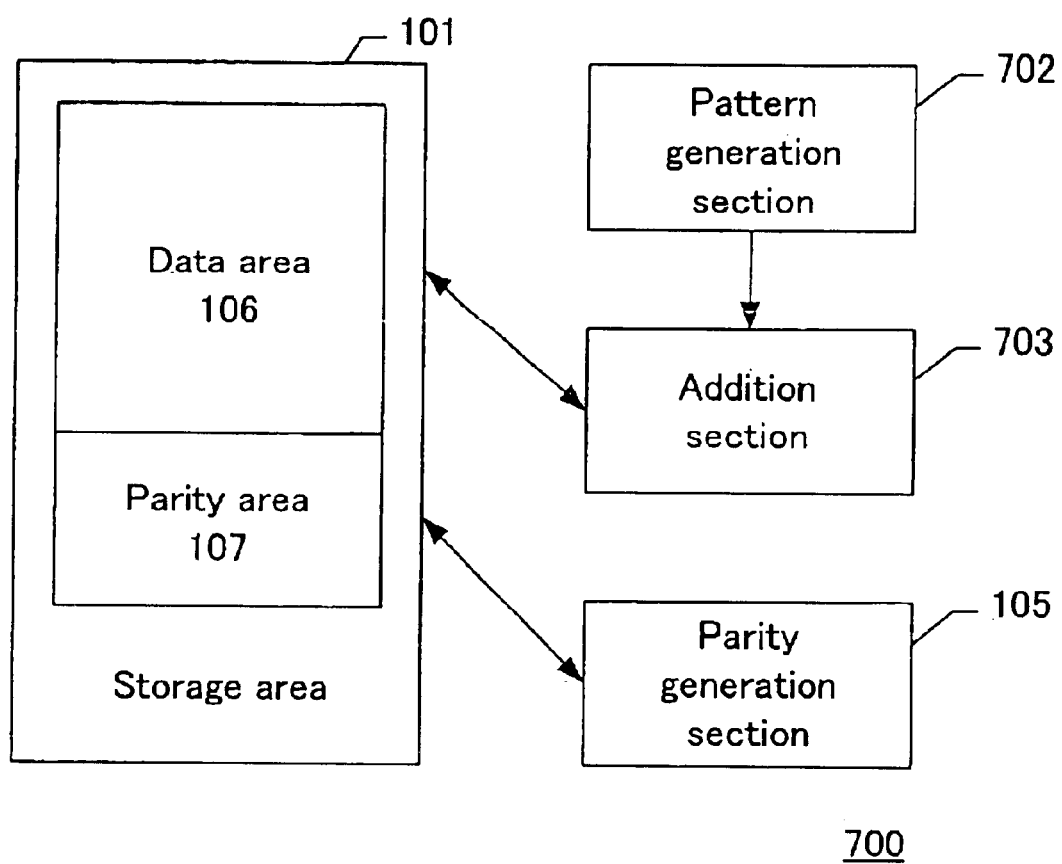
FIG. 8 shows a structure of an information encoding apparatus 700 according to a second example of the present invention.

FIG. 8 shows a structure of an information encoding apparatus 700 according to the second example of the present invention.

The information encoding apparatus 700 includes a storage section 101, a pattern generation section 702, an addition section 703, and a parity generation section 105.

The storage section 101 includes the data area 106 and the parity area 107.

In FIG. 8, identical elements to those described with reference to FIG. 3 bear identical reference numerals thereto and detailed descriptions thereof will be omitted.

The pattern generation section 702 is substantially the same as the pattern generation section 102 of the information encoding apparatus 100 except for outputting M scrambling patterns to the addition section 703, and thus will not be described in detail.

The addition section 703 applies, to each of the N pieces of information to be encoded, one corresponding scrambling pattern among the M scrambling patterns, so as to generate N pieces of scrambled information. Each of at least one of the M scrambling patterns is applied to two or more of the N pieces of information. The N pieces of scrambled information are stored in the data area 106. For example, the addition section 703 generates 32 sectors of scrambled information.

The addition section 703 adds a value represented by the ith byte of one sector of scrambling patterns (i bytes; i=1, 2, . . . , 2052) and a value represented by the ith byte of each sector of 32 sectors of information. Thus, the addition section 703 sequentially adds one sector of scrambling patterns output from the pattern generation section 702 and each of 32 sectors of information stored in the data area 106.

Figure 9:
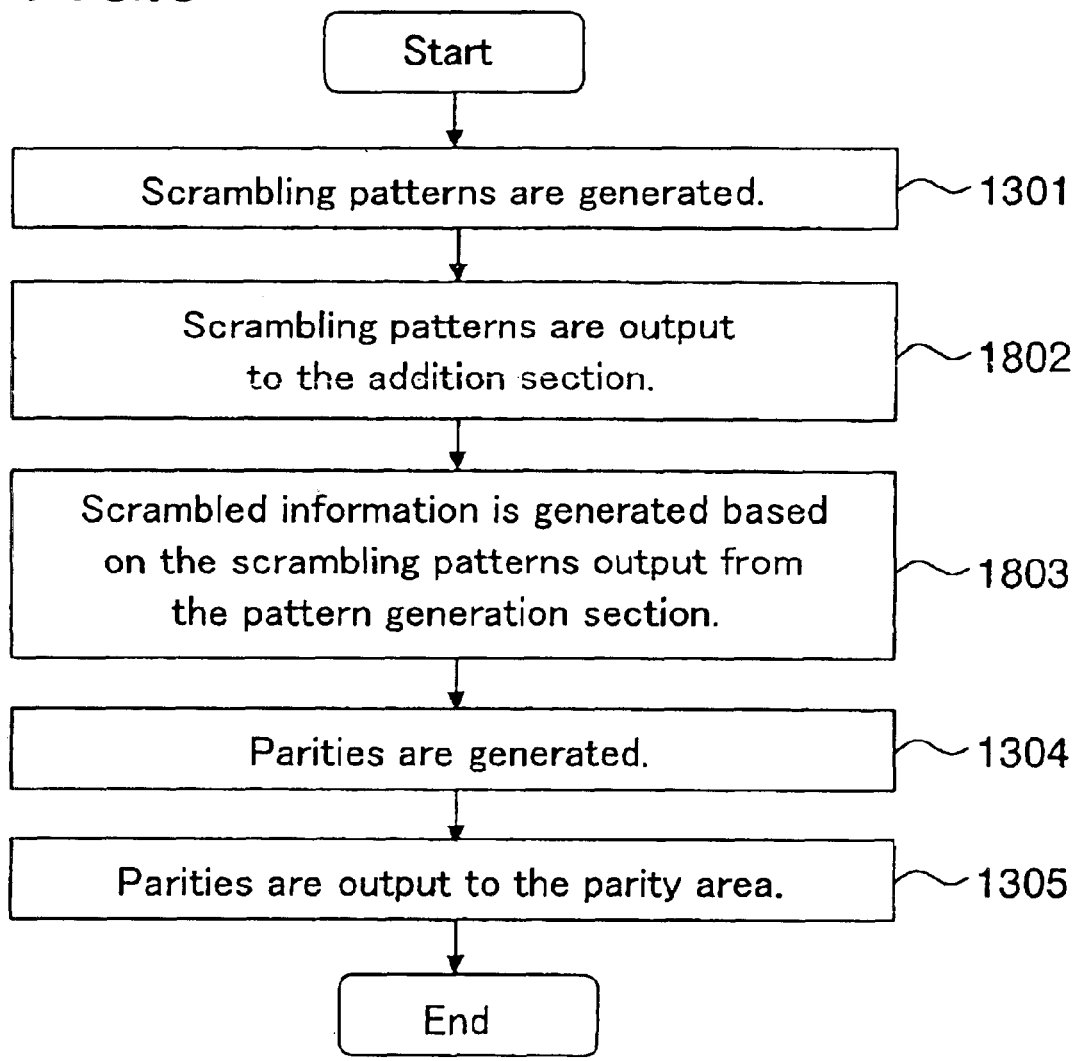
FIG. 9 is a flowchart illustrating a procedure for encoding information by the information encoding apparatus 700.

FIG. 9 shows a procedure for encoding information by the information encoding apparatus 700.

Hereinafter, the procedure will be described step by step. In FIG. 9, identical steps to those described with reference to FIG. 7 bear identical reference numerals thereto and detailed descriptions thereof will be omitted.

Step 1802: The pattern generation section 702 sequentially outputs one sector of scrambling patterns to the addition section 703.

After this, the processing advances to step 1803.

Step 1803: The addition section 703 generates 32 sectors of scrambled information. The generated 32 sectors of scrambled information are stored in the data area 106. The addition section 703 adds a value represented by the ith byte of one sector of scrambling patterns (i bytes; i =1, 2, . . . , 2052) and a value represented by the ith byte of each sector of 32 sectors of information. Thus, the addition section 703 sequentially adds one sector of scrambling patterns output from the pattern generation section 702 and each of 32 sectors of information stored in the data area 106.

According to the information encoding apparatus and method of the present invention, one corresponding scrambling pattern among M scrambling patterns is applied to each of N pieces of information (N>M≧1; where M and N are each an integer), so that N pieces of scrambled information are generated. Each of at least one of M scrambling patterns is applied to two or more of the N pieces of information.

Therefore, it is sufficient to generate M scrambling patterns for N pieces of information. It is not necessary to generate N scrambling patterns.

As a result, the number of times that the scrambling patterns need to be generated can be reduced, and thus the time required for generating scrambling patterns can be shortened.

In the second example, error correction codes having an error correction unit of 32 sectors and a sector size of 2052 bytes are used. The pattern generation section 702 generates one sector of scrambling patterns. The type of code used and the number of scrambling patterns generated by the pattern generation section 702 are not limited to the above. The type of code and the number of scrambling patterns generated by the pattern generation section 702 are arbitrary, as long as N pieces of scrambled information are generated by applying to, each of the N pieces of information, one corresponding scrambling pattern among the M scrambling patterns (N>M≧1; where M and N are each an integer) and each of at least one of the M scrambling patterns is applied to two or more of the N pieces of information.

For example, when M is a divisor of N, the addition section 703 applies one corresponding scrambling pattern among the M scrambling patterns to each of the N pieces of information such that the M scrambling patterns are repeated N/M times, so as to generate N pieces of scrambled information.

In the case where the information encoding apparatus 700 is included in the recording and reproduction apparatus, a section for performing error correction while reproduction may be used as the parity generation section 105 and parities may be generated by performing erasure correction.

In the second example, in order to generate N pieces of scrambled information, the addition section 703 adds each of the N pieces of information and one corresponding scrambling pattern among M scrambling patterns. The form of application is not limited to addition, as long as one corresponding scrambling pattern among M scrambling patterns is applied to each of the N pieces of information for generating N pieces of scrambled information. The form of application may be subtraction. In this case, the information encoding apparatus 700 includes a subtraction section instead of, or in addition to, the addition section 703.

In the example shown in FIG. 8, the pattern generation section 702 acts as the "scrambling pattern generation section for generating M scrambling patterns (N >M≧1; where M and N are each an integer)". The first storage section 101 and the addition section 703 together acts as the "scrambled information generation section for applying, to each of the N pieces of information, one corresponding scrambling pattern among the M scrambling patterns so as to generate N pieces of scrambled information". The first storage section 101 and the parity generation section 105 together act as the "encoded information generation section for supplying the N pieces of scrambled information with N parities, respectively, so as to generate encoded information". However, the elements included in the information encoding apparatus according to the present invention are not limited to the above.

The information encoding apparatus according to the present invention may have any structure as long as including elements acting as the "scrambling pattern generation section for generating M scrambling patterns (N>M≧1; where M and N are each an integer)", the "scrambled information generation section for applying, to each of the N pieces of information, one corresponding scrambling pattern among the M scrambling patterns so as to generate N pieces of scrambled information", and the "encoded information generation section for supplying the N pieces of scrambled information with N parities, respectively, so as to generate encoded information".

EXAMPLE 3

Figure 10:
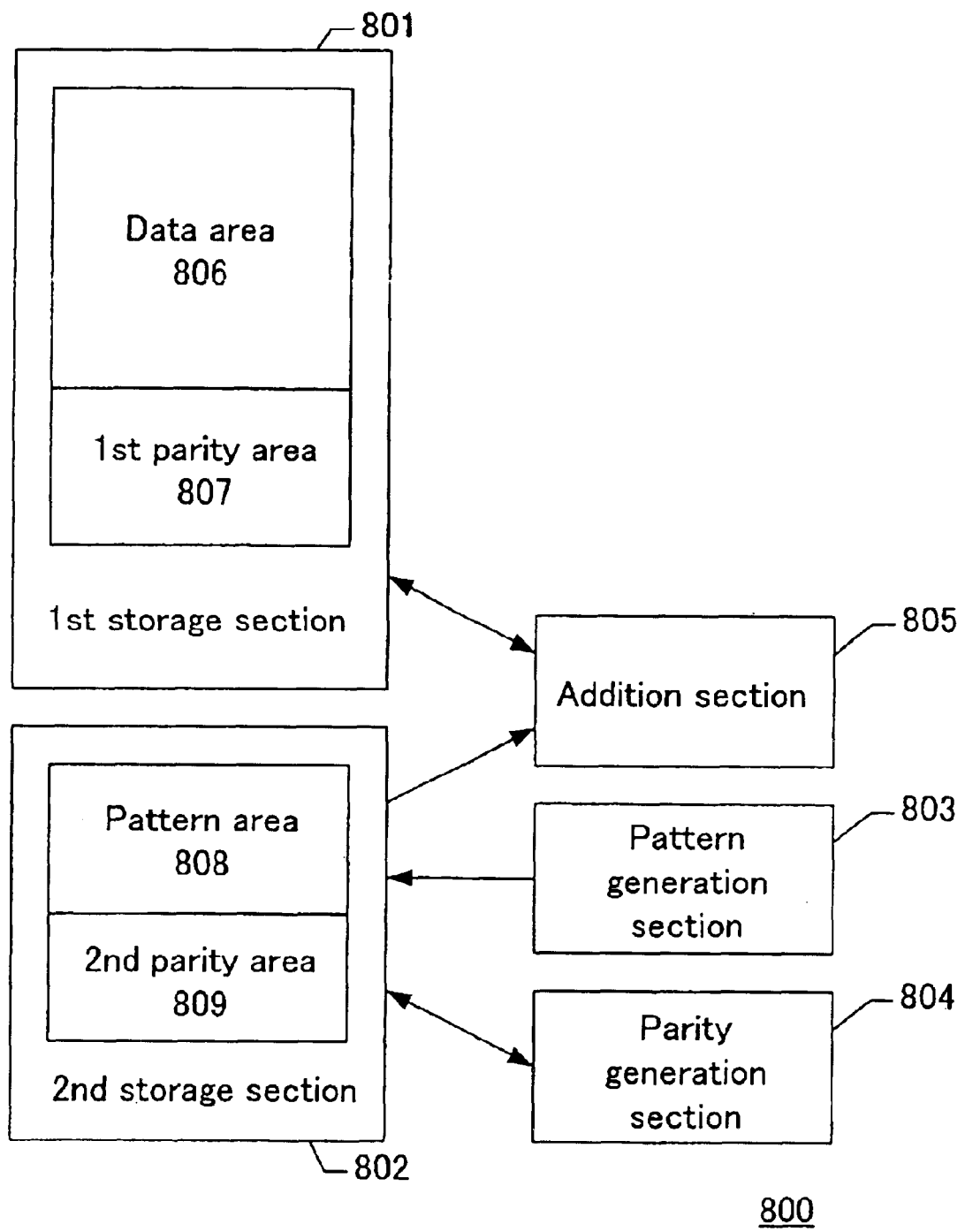
FIG. 10 shows a structure of an information re-encoding apparatus 800 according to a third example of the present invention.

FIG. 10 shows a structure of an information re-encoding apparatus 800 according to the third example of the present invention.

The information re-encoding apparatus 800 includes a first storage section 801, a second storage section 802, a pattern generation section 803, a parity generation section 804, and an addition section 805.

The information re-encoding apparatus 800 re-encodes a plurality of pieces of first encoded information into a plurality of pieces of second encoded information. The plurality of pieces of first encoded information include a plurality of pieces of first scrambled information scrambled by performing an arithmetic operation on a plurality of first scrambling patterns with respect to a plurality of pieces of information by a first method, and a plurality of first parities. The plurality of pieces of second encoded information include a plurality of pieces of second scrambled information scrambled by performing an arithmetic operation on a plurality of second scrambling patterns with respect to the plurality of pieces of information by the first method, and a plurality of second parities. The expression "performing an arithmetic operation on a plurality of first scrambling patterns with respect to a plurality of pieces of information by a first method" means, for example, adding the plurality of information and the plurality of first scrambling patterns.

The first storage section 801 stores scrambled information and parities for supplying the scrambled information with the parities.

The first storage section 801 includes a data area 806 and a first parity area 807.

In the data area 806, scrambled data (scrambled information), data to be encoded (information to be encoded), or encoded data (encoded information) is to be stored.

In the first parity area 807, parities are to be stored.

The second storage section 802 stores scrambling patterns and parities for supplying the scrambling patterns with the parities.

The second storage section 802 includes a pattern area 808 and a second parity area 809.

In the pattern area 808, scrambling patterns are to be stored.

In the second parity area 809, parities are to be stored.

The pattern generation section 803 is substantially the same as the pattern generation section 102 of the information encoding apparatus 100 except for generating a plurality of third scrambling patterns by performing an arithmetic operation on the plurality of first scrambling patterns with respect to the plurality of second scrambling patterns by a second method, and thus will not be described in detail. The expression "performing an arithmetic operation on the plurality of first scrambling patterns with respect to the plurality of second scrambling patterns by a second method" means, for example, obtaining a difference between the plurality of second scrambling patterns and the plurality of first scrambling patterns. In this case, the pattern generation section 803 obtains the difference between the plurality of second scrambling patterns and the plurality of first scrambling patterns, so as to generate a plurality of differential scrambling patterns.

The addition section 805 performs an arithmetic operation on the plurality of third scrambling patterns stored in the pattern area 808 with respect to the plurality of first scrambling patterns stored in the data area 806 by the first method, so as to generate a plurality of pieces of second scrambled information.

When M is a divisor of N, the addition section 805, for example, performs an arithmetic operation on one corresponding scrambling pattern among M third scrambling patterns with respect to each of N pieces (N sectors) of first scrambled information by the first method, such that the M (M sectors of) scrambling patterns are repeated N/M times, so as to generate N pieces of second scrambled information. The addition section 805, for example, further performs an arithmetic operation on one corresponding parity among M third parities with respect to each of N first parities stored in the first parity area 807 by the first method, such that the M third parities stored in the second parity area 809 are repeated N/M times, so as to generate N second parities.

The parity generation section 804 is substantially the same as the parity generation section 105 in the information encoding apparatus 100 except for generating the plurality of third parities in correspondence with the plurality of third scrambling patterns stored in the pattern area 808, and thus will not be described in detail.

In the third example, the expression "performing an arithmetic operation on information B with respect to information A by a first method" means adding information A and information B (A+B). The expression "performing an arithmetic operation on information B with respect to information A by a second method" means obtaining a difference between information A and information B (A−B, or B−A). As long as the arithmetic operation performed by the first method and the arithmetic operation performed by the second method fulfill (A∘B) ●B=A, the arithmetic operation performed by the first method is not limited to addition and the arithmetic operation performed by the second method is not limited to obtaining a difference. In the case where an arithmetic operation is performed on information B with respect to information A by the first method, the information re-encoding apparatus 800 includes a first arithmetic operation section for performing a first arithmetic operation on information A and information B instead of, or in addition to, the addition section 805. In the case where an arithmetic operation is performed on information B with respect to information A by the second method, the information re-encoding apparatus 800 includes a second arithmetic operation section for performing a second arithmetic operation on information A and information B instead of, or in addition to, the addition section 805.

The symbol "∘" represents a first operator representing the arithmetic operation to be performed by the first method, and the symbol "●" represents a second operator representing the arithmetic operation to be performed by the second method. Information A and information B represent an arbitrary value.

Figure 11:
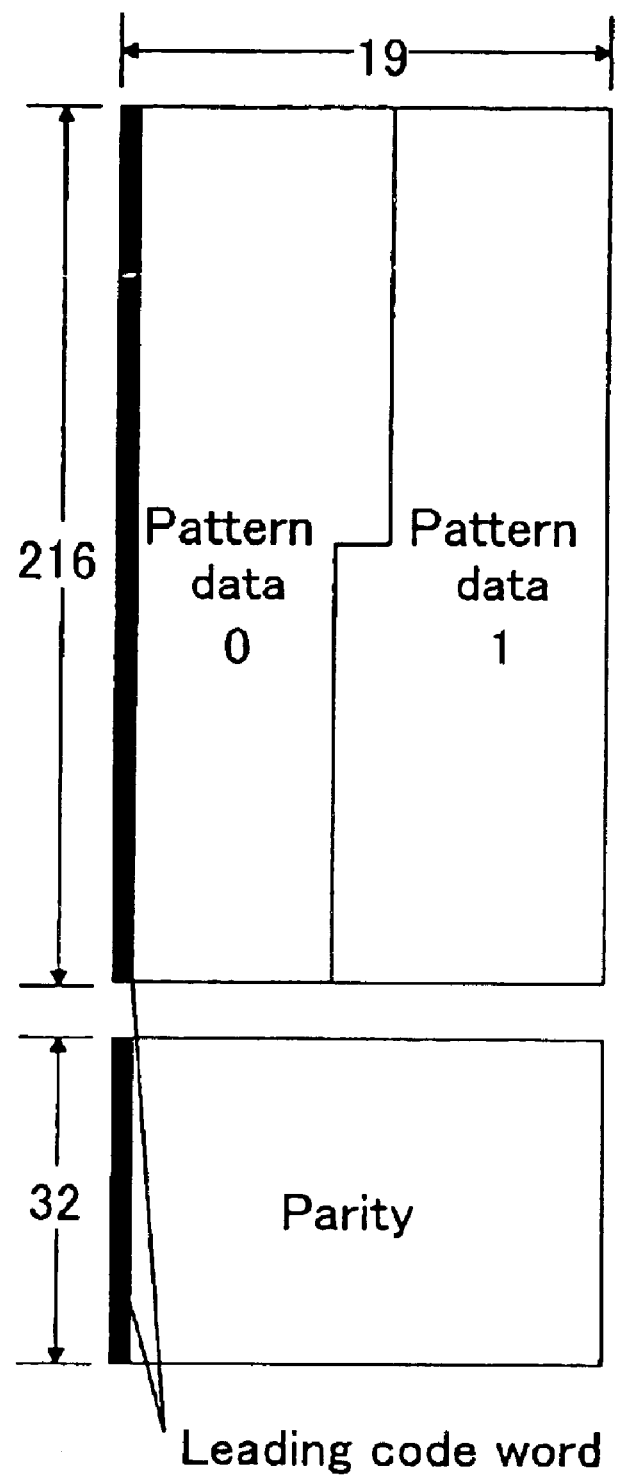
FIG. 11 shows an exemplary format of information to be stored in a second storage section 802.

FIG. 11 shows an exemplary format of the information stored in the second storage section 802.

Pattern data 0 and pattern data 1 are each one sector (2052-byte) of scrambling patterns.

Figure 12:
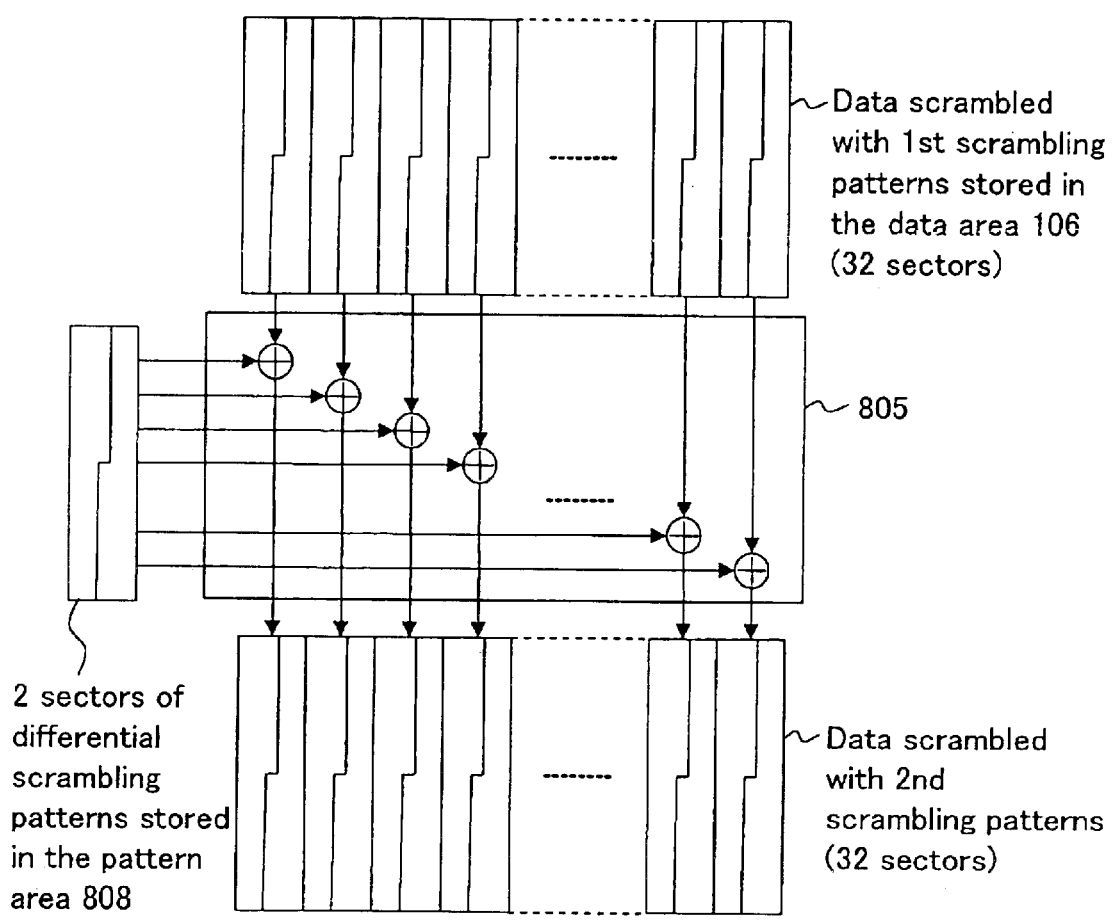
FIG. 12 shows an example in which an addition section 805 adds differential scrambling patterns to a plurality of pieces of scrambled information.

FIG. 12 shows an example in which the addition section 805 adds differential scrambling patterns to a plurality of pieces of scrambled information.

The addition section 805 adds pattern data 0 stored in the pattern area 808 to each pair of user data 0 and error detection code EDC0, user data 2 and error detection code EDC2, user data 4 and error detection code EDC4, . . . user data 30 and error detection code EDC30 stored in the data area 806. Similarly, the addition section 805 adds pattern data 1 stored in the pattern area 808 to each pair of user data 1 and error detection code EDC1, user data 3 and error detection code EDC3, user data 5 and error detection code EDC5, . . . user data 31 and error detection code EDC31 stored in the data area 806.

Thus, the addition section 805 adds each of N sectors of first scrambled information and one corresponding differential scrambling pattern among M sectors of differential scrambling patterns, such that the M sectors of differential scrambling patterns are repeated N/M times, so as to generate N sectors of second scrambled information. M is a divisor of N, and a differential scrambling pattern is a scrambling pattern generated by obtaining a difference between the first scrambling pattern and the second scrambling pattern. The first scrambled information is information scrambled with the first scrambling pattern, and the second scrambled information is information scrambled with the second scrambling pattern.

Figure 13:
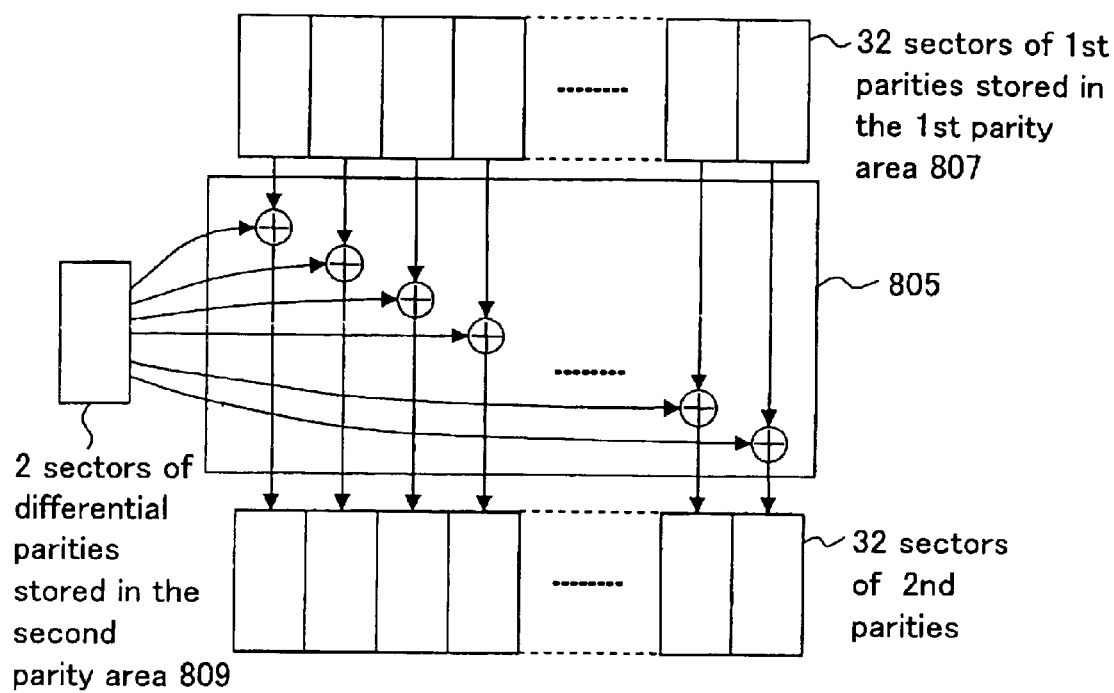
FIG. 13 shows an example in which the addition section 805 adds differential parities corresponding to the differential scrambling patterns to first parities corresponding to the plurality of pieces of scrambled information.

FIG. 13 shows an example in which the addition section 805 adds differential parities corresponding to the differential scrambling patterns and the first parities corresponding to a plurality of pieces of scrambled information.

The addition section 805 adds two sectors of differential parities stored in the second parity area 809 to the first two sectors (the first sector and the second sector) of first parities among 32 sectors of first parities stored in the first parity area 807, so as to generate two sectors of second parities. The addition section 805 also adds two sectors of differential parities stored in the second parity area 809 to the next two sectors (the third sector and the fourth sector) of first parities among 32 sectors of first parities stored in the first parity area 807, so as to generate two sectors of second parities.

Thus, the addition section 805 adds each of the N sectors of first parities and one corresponding differential parity among M sectors of differential parities, such that the M sectors of differential parities are repeated N/M times, so as to generate N sectors of second parities. M is a divisor of N, and a differential parity is a parity generated by obtaining a difference between the first parity and the second parity. The first parity is a parity corresponding to the first scrambled information, and the second parity is a parity corresponding to the second scrambled information. The first scrambled information is information scrambled with the first scrambling pattern, and the second scrambled information is information scrambled with the second scrambling pattern.

Figure 14:
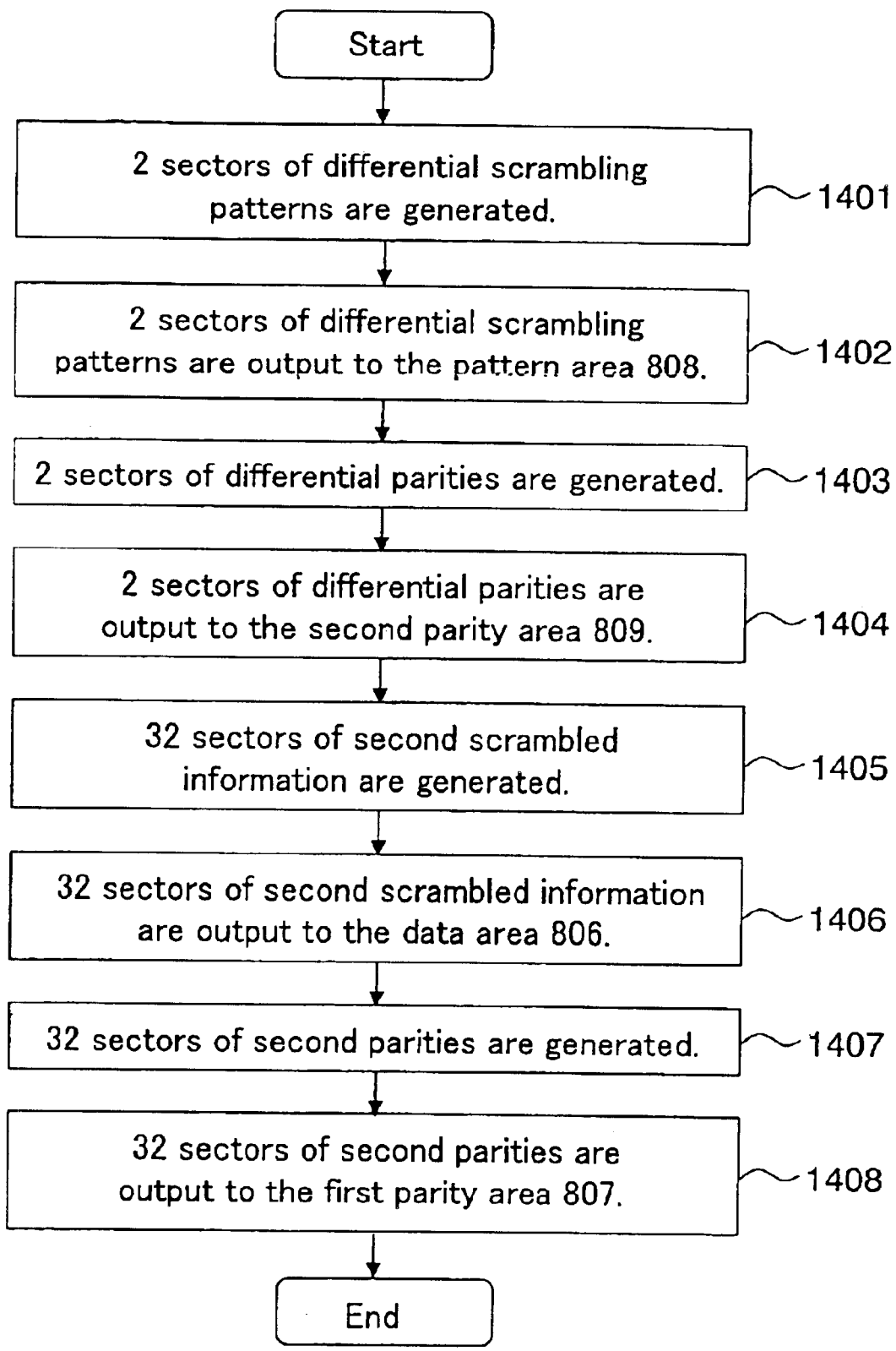
FIG. 14 is a flowchart illustrating a procedure for re-encoding a plurality of pieces of first encoded information into a plurality of pieces of second encoded information by the information re-encoding apparatus 800.

FIG. 14 shows a procedure for re-encoding a plurality of pieces of first encoded information into a plurality of pieces of second encoded information by the information re-encoding apparatus 800.

Hereinafter, the procedure will be described step by step.

The plurality of pieces of first encoded information include a plurality of pieces of first scrambled information scrambled by performing an arithmetic operation on the plurality of first scrambling patterns with respect to a plurality of pieces of information by a first method (addition), and a plurality of first parities. The plurality of pieces of second encoded information include a plurality of pieces of second scrambled information scrambled by performing an arithmetic operation on the plurality of second scrambling patterns with respect to the plurality of pieces of information by the first method (addition), and a plurality of second parities.

It is assumed here that the first storage section 801 has 32 sectors of first encoded information stored therein, and that the data area 806 has 32 sectors of first scrambled information stored therein. It is also assumed that the first parity area 807 has 32 sectors of first parities stored therein.

Step 1401: The pattern generation section 803 generates two sectors (two periods) of differential scrambling patterns. Differential scrambling patterns are generated by obtaining a difference between the first scrambling patterns and the second scrambling patterns. For example, where the species of scrambling for generating the first scrambling patterns is SB and the species of scrambling for generating the second scrambling patterns is SC, the pattern generation section 803 sets the species of scrambling for generating the differential scrambling patterns (difference between SB and SC; SC−SB) at s15 through s0. In the error correction code format used in the third example, two sectors of differential scrambling patterns are generated from LCM (2052, 216)/2052=2. The two sectors of scrambling patterns corresponds to 4104 bytes as a result of one sector of scrambling patterns (2052 bytes) being repeated twice.

After the two sectors of scrambling patterns (4104 bytes) are generated, the processing advances to step 1402.

Step 1402: The pattern generation section 803 outputs two sectors of differential scrambling patterns to the pattern area 808.

After this, the processing advances to step 1403.

Step 1403: The pattern area 808 stores the two sectors of differential scrambling patterns. The parity generation section 804 generates two sectors of differential parities in correspondence with the two sectors of differential scrambling patterns. In the error correction code format used in the third example, 19 code words of differential parities are generated.

After this, the processing advances to step 1404.

Step 1404: The parity generation section 804 outputs the two sectors of differential parities to the second parity area 809.

After this, the processing advances to step 1405.

Step 1405: The second parity area 809 stores the two sectors of differential parities. The addition section 805 adds each of the 32 sectors of first scrambled information stored in the data area 806 and one corresponding differential scrambling pattern among the two sectors of differential scrambling patterns, such that the two sectors of differential scrambling patterns are repeated 16 times, so as to generate 32 sectors of second scrambled information. For example, the addition section 805 adds pattern data 0 stored in the pattern area 808 to each pair of user data 0 and error detection code EDC0, user data 2 and error detection code EDC2, user data 4 and error detection code EDC4, ... user data 30 and error detection code EDC30 stored in the data area 806. Similarly, the addition section 805 adds pattern data 1 stored in the pattern area 808 to each pair of user data 1 and error detection code EDC1, user data 3 and error detection code EDC3, user data 5 and error detection code EDC5, ... user data 31 and error detection code EDC31 stored in the data area 806 (see FIG. 12).

After the 32 sectors of second scrambled information are generated, the processing advances to step 1406.

Step 1406: The addition section 805 outputs the 32 sectors of second scrambled information to the data area 806.

After this, the processing advances to step 1407.

Step 1407: The data area 806 stores the 32 sectors of second scrambled information. The addition section 805 adds two sectors of differential parities stored in the second parity area 809 to the first two sectors (the first sector and the second sector) of first parities among 32 sectors (304 code words) of first parities stored in the first parity area 807, so as to generate two sectors of second parities. The addition section 805 also adds two sectors of differential parities stored in the second parity area 809 to the next two sectors (the third sector and the fourth sector) of first parities among 32 sectors of first parities stored in the first parity area 807, so as to generate two sectors of second parities.

Thus, the addition section 805 adds each of the 32 sectors of first parities and one corresponding differential parity among two sectors of differential parities, such that the two sectors of differential parities are repeated 16 times, so as to generate 32 sectors of second parities.

After the 32 sectors of second parities are generated, the processing advances to step 1408.

Step 1408: The addition section 805 outputs the 32 sectors of second parities to the first parity area 807. The 32 sectors of second scrambled information are supplied with 32 sectors of second parities, so that 32 sectors of second encoded information are generated.

After this, the processing is completed.

According to the information re-encoding apparatus and method of the present invention, a plurality of third scrambling patterns are generated by performing an arithmetic operation on a plurality of first scrambling patterns with respect to a plurality of second scrambling patterns by a second method, and a plurality of pieces of second scrambled information are generated by performing an arithmetic operation on the plurality of third scrambling patterns with respect to a plurality of pieces of first scrambled information by a first method. The arithmetic operations performed by the first method and the second method fulfill (A∘B) ●B=A. The symbol "∘" represents a first operator representing the arithmetic operation to be performed by the first method, and the symbol "●" represents a second operator representing the arithmetic operation to be performed by the second method. Information A and information B represent an arbitrary value.

By re-scrambling the plurality of pieces of first scrambled information, a plurality of pieces of second scrambled information can be generated from the plurality of pieces of first scrambled information without generating a plurality of pieces of information. Thus, the time required for generating the plurality of pieces of second encoded information from the plurality of pieces of first encoded information can be shortened.

In the third example, the expression "performing an arithmetic operation on information B with respect to information A by a first method" means adding information A and information B (A+B). The expression "performing an arithmetic operation on information B with respect to information A by a second method" means obtaining a difference between information A and information B (A−B, or B−A). As long as the arithmetic operation performed by the first method and the arithmetic operation performed by the second method fulfill (A∘B) ●B=A, the arithmetic operation performed by the first method is not limited to addition and the arithmetic operation performed by the second method is not limited to obtaining a difference.

In the third example, error correction codes having an error correction unit of 32 sectors, a sector size of 2052 bytes, and an information section of the code word of 216 bytes are used. The pattern generation section 803 generates two sectors of differential scrambling patterns. The type of code used and the number of scrambling patterns generated by the pattern generation section 803 are not limited to the above. The type of code and the number of scrambling patterns generated by the pattern generation section 803 are arbitrary, as long as a plurality of third scrambling patterns are generated by performing an arithmetic operation on a plurality of first scrambling patterns with respect to a plurality of second scrambling patterns by a second method, and a plurality of pieces of second scrambled information are generated by performing an arithmetic operation on the plurality of third scrambling patterns with respect to a plurality of pieces of first scrambled information by a first method. The arithmetic operations performed by the first method and the second method fulfill (A∘B) ●B=A. The symbol "∘" represents a first operator representing the arithmetic operation to be performed by the first method, and the symbol "●" represents a second operator representing the arithmetic operation to be performed by the second method. Information A and information B represent an arbitrary value.

For example, when the arithmetic operation performed by the second method is obtaining a difference, differential scrambling patterns are generated as the third scrambling patterns. The size of the third scrambling patterns may be determined by LCM (sector size, size of the information section of the code word)/sector size.

In the third example, a Read-Solomon code is used as the error correction code. The error correction code is not limited to the Read-Solomon code as long as the error correction code is linear.

One storage section may be divided into a plurality of areas, in which case one of the plurality of areas is used as the first storage section 801 and another one of the plurality of areas is used as the second storage section 802.

In the case where the information re-encoding apparatus 800 is included in the recording and reproduction apparatus, a section for performing error correction while reproduction may be used as the parity generation section 804 and parities may be generated by performing erasure correction.

In the example shown in FIG. 10, the second storage section 802 and the pattern generation section 803 together act as the "third scrambling pattern generation section for performing an arithmetic operation on the plurality of first scrambling patterns with respect to the plurality of second scrambling patterns by a second method, so as to generate a plurality of third scrambling patterns". The first storage section 801, the second storage section 802, and the addition section 805 together act as the "scrambled information generation section for performing an arithmetic operation on the plurality of third scrambling patterns with respect to the plurality of pieces of first scrambled information by the first method, so as to generate the plurality of pieces of second scrambled information". The first storage section 801, the second storage section 802, the parity generation section 804, and the addition section 805 together act as the "encoded information generation section for supplying the plurality of pieces of second scrambled information with the plurality of second parities, so as to generate the plurality of pieces of second encoded information". However, the elements included in the information encoding apparatus according to the present invention are not limited to the above.

The information re-encoding apparatus according to the present invention may have any structure as long as including elements acting as the "third scrambling pattern generation section for performing an arithmetic operation on the plurality of first scrambling patterns with respect to the plurality of second scrambling patterns by a second method, so as to generate a plurality of third scrambling patterns", the "scrambled information generation section for performing an arithmetic operation on the plurality of third scrambling patterns with respect to the plurality of pieces of first scrambled information by the first method, so as to generate the plurality of pieces of second scrambled information", and the "encoded information generation section for supplying the plurality of pieces of second scrambled information with the plurality of second parities, so as to generate the plurality of pieces of second encoded information".

EXAMPLE 4

Figure 15:
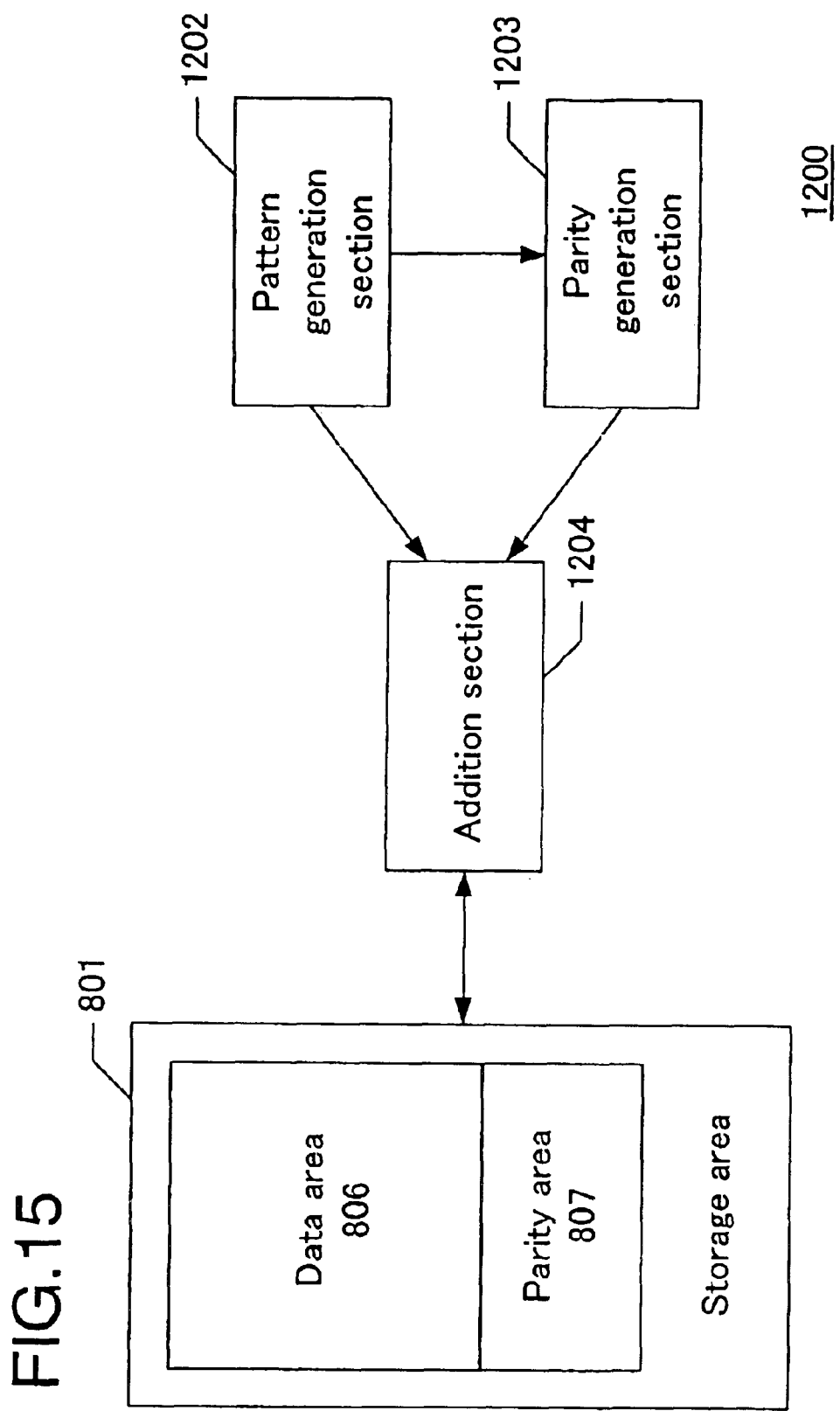
FIG. 15 shows a structure of an information re-encoding apparatus 1200 according to a fourth example of the present invention.

FIG. 15 shows a structure of an information re-encoding apparatus 1200 according to the fourth example of the present invention.

The information re-encoding apparatus 1200 includes a storage section 801, a pattern generation section 1202, an addition section 1204, and a parity generation section 1203.

The storage section 801 includes the data area 806 and the parity area 807.

In FIG. 15, identical elements to those described with reference to FIG. 10 bear identical reference numerals thereto and detailed descriptions thereof will be omitted.

The pattern generation section 1202 is substantially the same as the pattern generation section 102 of the information encoding apparatus 100 except for generating a plurality third scrambling patterns by performing an arithmetic operation on a plurality of first scrambling patterns with respect to a plurality of second scrambling patterns by a second method and outputting the generated plurality of third scrambling patterns to the addition section 1204 and the parity generation section 1203, and thus will not be described in detail.

The parity generation section 1203 is substantially the same as the parity generation section 105 in the information encoding apparatus 100 except for generating a plurality of third parities (differential parities) in correspondence with the plurality of third scrambling patterns (differential scrambling patterns) output from the pattern generation section 1202, and thus will not be described in detail.

The addition section 1204 performs an arithmetic operation on the plurality of third scrambling patterns output from the pattern generation section 1202 with respect to a plurality of pieces of first scrambled information stored in the data area 806 by a first method (addition), so as to generate a plurality of pieces of second scrambled information.

When M is a divisor of N, the addition section 1204, for example, performs an arithmetic operation on one corresponding third scrambling pattern among M third scrambling patterns output from the pattern generation section 1202 with respect to each of the N pieces (N sectors) of first scrambled information stored in the data area 806 by the first method (addition), such that the M (M sectors of) third scrambling patterns output from the pattern generation section 1202 are repeated N/M times, so as to generate N pieces of second scrambled information. The addition section 1204 also, for example, performs an arithmetic operation on one corresponding third parity among M third parities output from the parity generation section 1203 with respect to each of the N (N sectors of) first parities stored in the first parity area 807 by the first method, such that the M third parities output from the parity generation section 1203 are repeated N/M times, so as to generate N second parities.

For example, the addition section 1204 sequentially adds two sectors of differential scrambling patterns (i bytes; i=1 through 4104) output from the pattern generation section 1202 to the 32 sectors of first scrambled information stored in the data area 806. Namely, the addition section 1204 adds the ith byte of two sectors of differential scrambling patterns to the ith byte of the odd-numbered sectors among the 32 sectors of first scrambled information for i=1 through 2052, and adds the ith byte of two sectors of differential scrambling patterns to the ith through 2052nd bytes of the even-numbered sectors among the 32 sectors of first scrambled information stored in the data area 806 for i=2053 through 4104 (see FIG. 12).

The addition section 1204 adds two sectors of differential parities output from the parity generation section 1203 to the first two sectors (the first sector and the second sector) of first parities among 32 sectors (304 code words) of first parities stored in the first parity area 807, so as to generate two sectors of second parities. The addition section 1204 also adds two sectors of differential parities output from the parity generation section 1203 to the next two sectors (the third sector and the fourth sector) of first parities among 32 sectors of first parities stored in the first parity area 807, so as to generate two sectors of second parities. Thus, the addition section 1204 adds each of the 32 sectors of first parities and one corresponding differential parity among two sectors of differential parities, such that the two sectors of differential parities are repeated 16 times, so as to generate 32 sectors of second parities.

In the fourth example, the expression "performing an arithmetic operation on information B with respect to information A by a first method" means adding information A and information B (A+B). The expression "performing an arithmetic operation on information B with respect to information A by a second method" means obtaining a difference between information A and information B (A−B, or B−A). As long as the arithmetic operation performed by the first method and the arithmetic operation performed by the second method fulfill (A∘B) ●B=A, the arithmetic operation performed by the first method is not limited to addition and the arithmetic operation performed by the second method is not limited to obtaining a difference. In the case where an arithmetic operation is performed on information B with respect to information A by the first method, the information re-encoding apparatus 1200 includes a first arithmetic operation section for performing a first arithmetic operation on information A and information B instead of, or in addition to, the addition section 1204. In the case where an arithmetic operation is performed on information B with respect to information A by the second method, the information re-encoding apparatus 1200 includes a second arithmetic operation section for performing a second arithmetic operation on information A and information B instead of, or in addition to, the addition section 1204.

Figure 16:
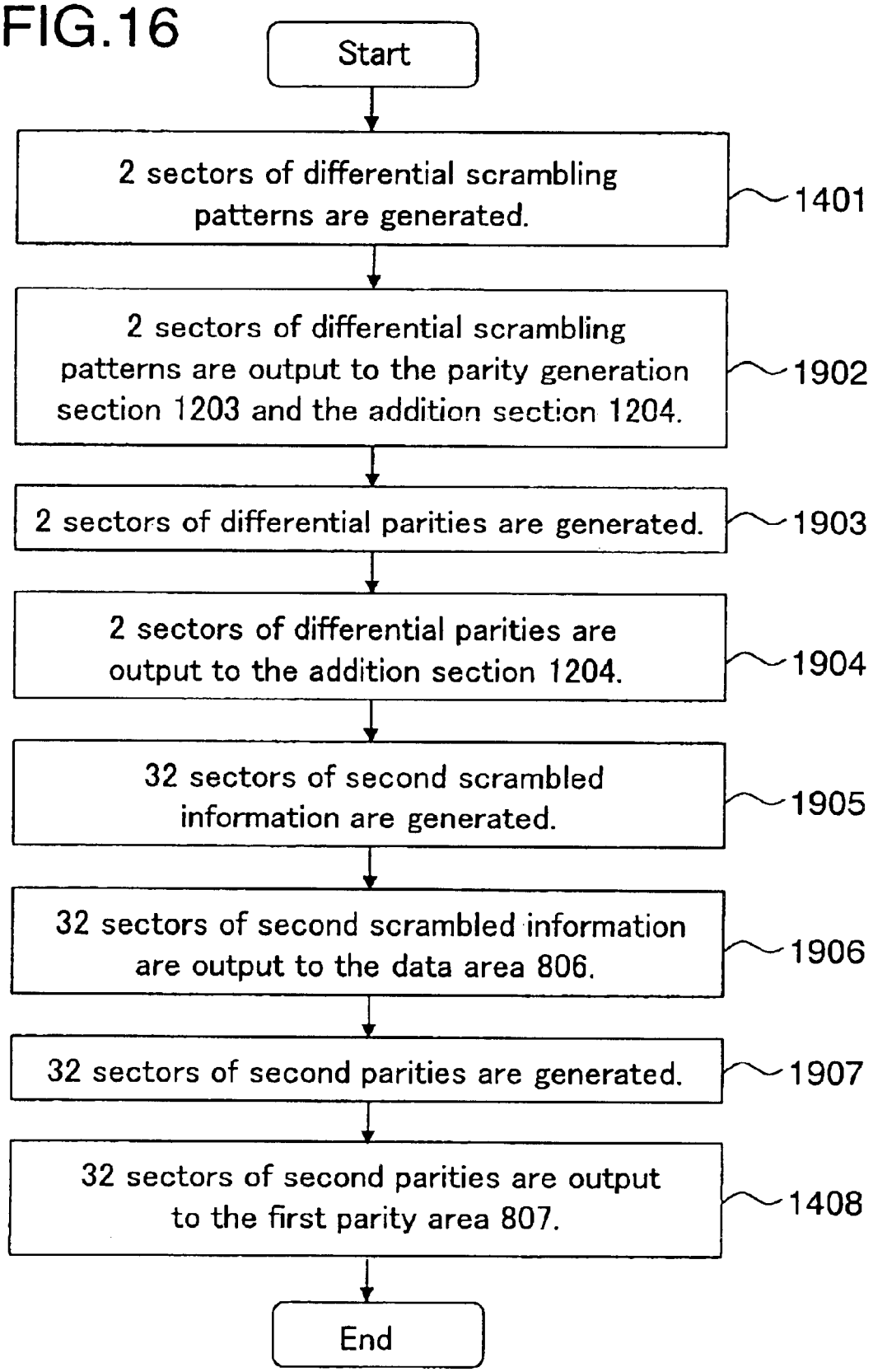
FIG. 16 is a flowchart illustrating a procedure for re-encoding the plurality of pieces of first encoded information into the plurality of pieces of second encoded information by the information re-encoding apparatus 1200.
Figure 17:
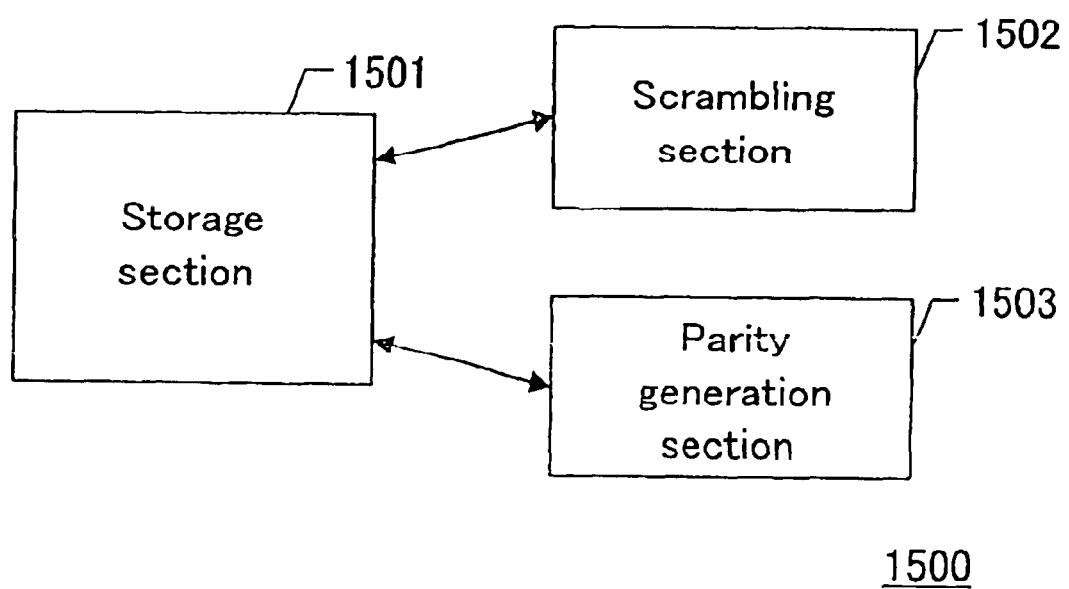
FIG. 17 shows a conventional information encoding apparatus 1500.
Figure 18:
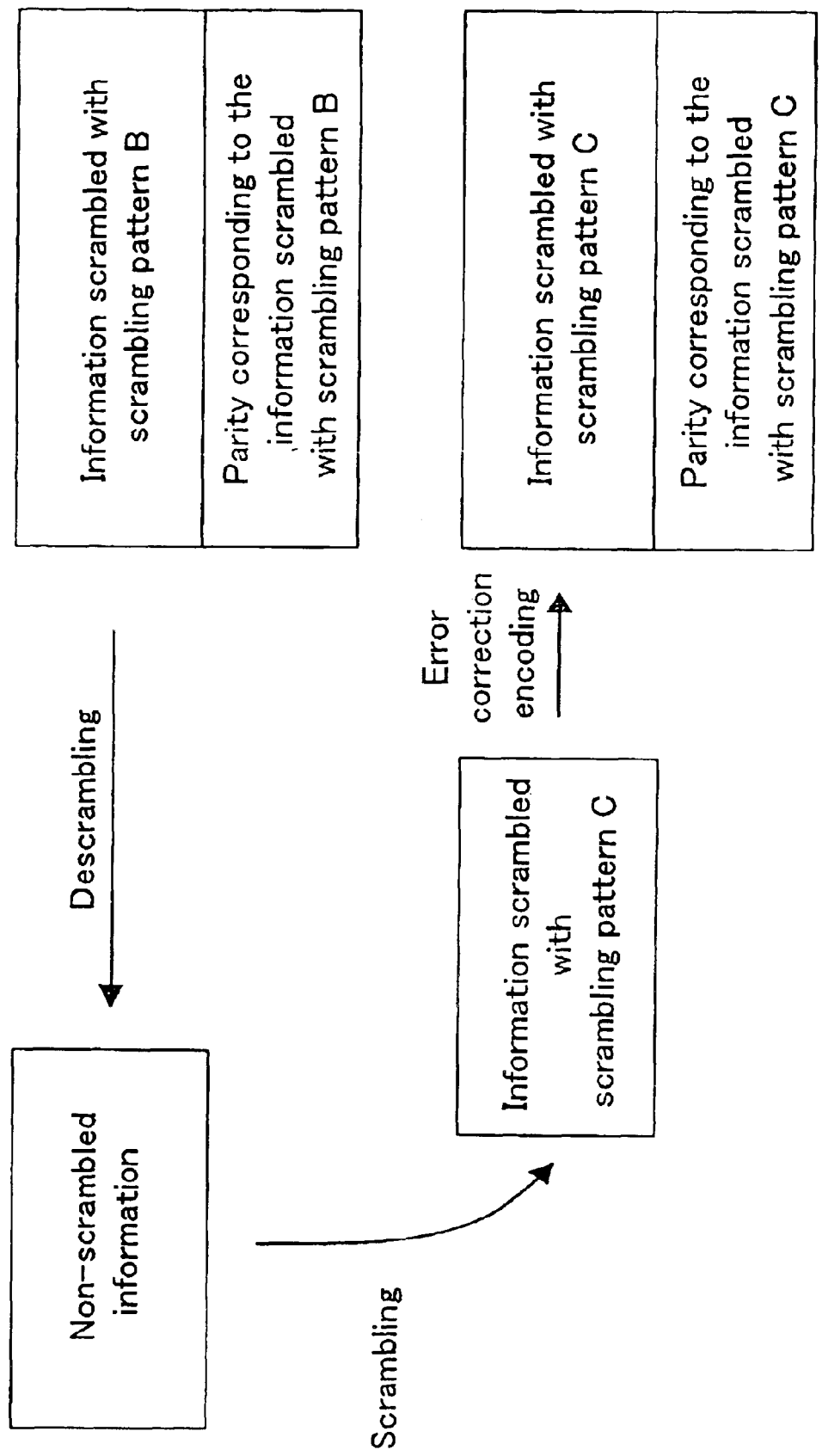
FIG. 18 illustrates re-encoding of information.
Figure 19:
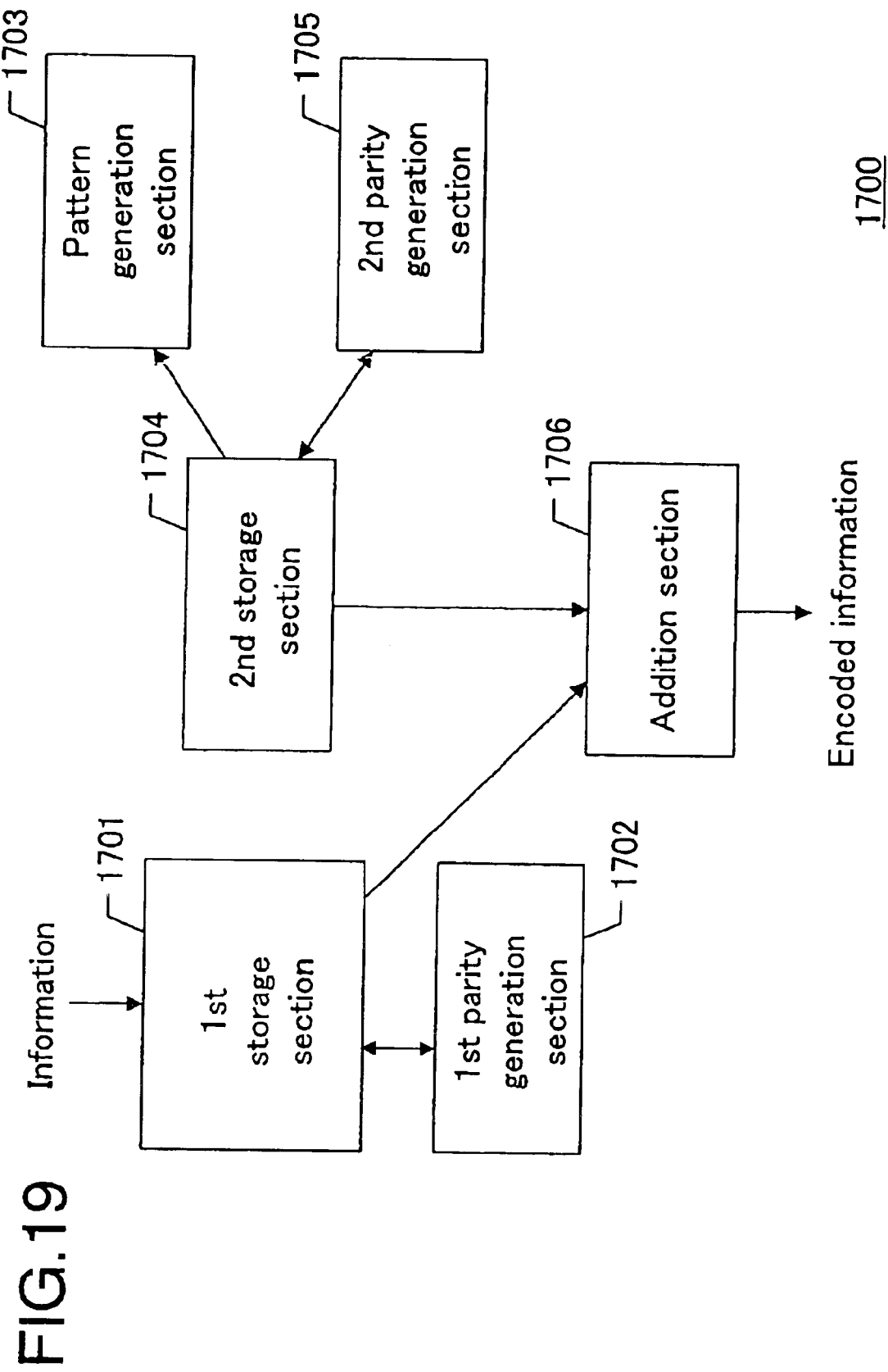
FIG. 19 shows another conventional information encoding apparatus 1700.

FIG. 16 shows a procedure for re-encoding information by the information re-encoding apparatus 1200.

Hereinafter, the procedure will be described step by step. In FIG. 16, identical steps to those described with reference to FIG. 14 bear identical reference numerals thereto and detailed descriptions thereof will be omitted.

The plurality of pieces of first encoded information include a plurality of pieces of first scrambled information scrambled by performing an arithmetic operation on the plurality of first scrambling patterns with respect to a plurality of pieces of information by a first method (addition), and a plurality of first parities. The plurality of pieces of second encoded information include a plurality of pieces of second scrambled information scrambled by performing an arithmetic operation on the plurality of second scrambling patterns with respect to the plurality of pieces of information by the first method (addition), and a plurality of second parities.

It is assumed here that the first storage section 801 has 32 sectors of first encoded information stored therein, and that the data area 806 has 32 sectors of first scrambled information stored therein. It is also assumed that the first parity area 807 has 32 sectors of first parities stored therein.

Step 1902: The pattern generation section 1202 outputs two sectors of differential scrambling patterns to the parity generation section 1203 and the addition section 1204.

After this, the processing advances to step 1903.

Step 1903: The parity generation section 1203 generates two sectors of differential parities in correspondence with the two sectors of differential scrambling patterns output from the pattern generation section 1202. In the error correction code format used in the fourth example, 19 code words of differential parities are generated.

After this, the processing advances to step 1904.

Step 1904: The parity generation section 1203 outputs the two sectors of differential parities to the addition section 1204.

After this, the processing advances to step 1905.

Step 1905: The addition section 1204 adds each of the 32 sectors of first scrambled information stored in the data area 806 and one corresponding differential scrambling pattern among two sectors of differential scrambling patterns, such that the two sectors of differential scrambling patterns output from the pattern generation section 1202 are repeated 16 times, so as to generate 32 sectors of second scrambled information. For example, the addition section 1204 adds pattern data 0 output from the pattern generation section 1202 to each pair of user data 0 and error detection code EDC0, user data 2 and error detection code EDC2, user data 4 and error detection code EDC4, ... user data 30 and error detection code EDC30 stored in the data area 806. Similarly, the addition section 1204 adds pattern data 1 output from the pattern generation section 1202 to each pair of user data 1 and error detection code EDC1, user data 3 and error detection code EDC3, user data 5 and error detection code EDC5, ... user data 31 and error detection code EDC31 stored in the data area 806 (see FIG. 12).

After the 32 sectors of second scrambled information are generated, the processing advances to step 1906.

Step 1906: The addition section 1204 outputs the 32 sectors of second scrambled information to the data area 806.

After this, the processing advances to step 1907.

Step 1907: The data area 806 stores the 32 sectors of second scrambled information. The addition section 1204 adds two sectors of differential parities output from the parity generation section 1203 to the first two sectors (the first sector and the second sector) of first parities among 32 sectors (304 code words) of first parities stored in the first parity area 807, so as to generate two sectors of second parities. The addition section 1204 also adds two sectors of differential parities output from the parity generation section 1203 to the next two sectors (the third sector and the fourth sector) of first parities among 32 sectors of first parities stored in the first parity area 807, so as to generate two sectors of second parities.

Thus, the addition section 1204 adds each of the 32 sectors of first parities and one corresponding differential parity among two sectors of differential parities, such that the two sectors of differential parities output from the parity generation section 1203 are repeated 16 times, so as to generate 32 sectors of second parities.

After the 32 sectors of second parities are generated, the processing in step 1408 is performed, thereby generating 32 sectors of second encoded information. Then, the processing is completed.

According to the information re-encoding apparatus and method of the present invention, a plurality of third scrambling patterns are generated by performing an arithmetic operation on a plurality of first scrambling patterns with respect to a plurality of second scrambling patterns by a second method, and a plurality of pieces of second scrambled information are generated by performing an arithmetic operation on the plurality of third scrambling patterns with respect to a plurality of pieces of first scrambled information by a first method. The arithmetic operations performed by the first method and the second method fulfill (A∘B) ●B=A. The symbol "∘" represents a first operator representing the arithmetic operation to be performed by the first method, and the symbol "●" represents a second operator representing the arithmetic operation to be performed by the second method. Information A and information B represent an arbitrary value.

By re-scrambling the plurality of pieces of first scrambled information, a plurality of pieces of second scrambled information can be generated from the plurality of pieces of first scrambled information without generating a plurality of pieces of information. Thus, the time required for generating the plurality of pieces of second encoded information from the plurality of pieces of first encoded information can be shortened.

In the fourth example, the expression "performing an arithmetic operation on information B with respect to information A by a first method" means adding information A and information B (A+B). The expression "performing an arithmetic operation on information B with respect to information A by a second method" means obtaining a difference between information A and information B (A−B, or B−A). As long as the arithmetic operation performed by the first method and the arithmetic operation performed by the second method fulfill (A∘B) ●B=A, the arithmetic operation performed by the first method is not limited to addition and the arithmetic operation performed by the second method is not limited to obtaining a difference.

In the fourth example, error correction codes having an error correction unit of 32 sectors, a sector size of 2052 bytes, and an information section of the code word of 216 bytes are used. The pattern generation section 1202 generates two sectors of differential scrambling patterns. The type of code used and the number of scrambling patterns generated by the pattern generation section 1202 are not limited to the above. The type of code and the number of scrambling patterns generated by the pattern generation section 1202 are arbitrary, as long as a plurality of third scrambling patterns are generated by performing an arithmetic operation on a plurality of first scrambling patterns with respect to a plurality of second scrambling patterns by a second method, and a plurality of pieces of second scrambled information are generated by performing an arithmetic operation on the plurality of third scrambling patterns with respect to a plurality of pieces of first scrambled information by a first method. The arithmetic operations performed by the first method and the second method fulfill (A∘B) ●B=A. The symbol "∘" represents a first operator representing the arithmetic operation to be performed by the first method, and the symbol "●" represents a second operator representing the arithmetic operation to be performed by the second method. Information A and information B represent an arbitrary value.

For example, when the arithmetic operation performed by the second method is obtaining a difference, differential scrambling patterns are generated as the third scrambling patterns. The size of the third scrambling patterns may be determined by LCM (sector size, size of the information section of the code word)/sector size.

In the fourth example, a Read-Solomon code is used as the error correction code. The error correction code is not limited to the Read-Solomon code as long as the error correction code is linear.

In the case where the information encoding apparatus 1200 is included in the recording and reproduction apparatus, a section for performing error correction while reproduction may be used as the parity generation section 1203 and parities may be generated by performing erasure correction.

In the example shown in FIG. 15, the pattern generation section 1202 acts as the "third scrambling pattern generation section for performing an arithmetic operation on the plurality of first scrambling patterns with respect to the plurality of second scrambling patterns by a second method, so as to generate a plurality of third scrambling patterns". The first storage section 801 and the addition section 1204 together act as the "scrambled information generation section for performing an arithmetic operation on the plurality of third scrambling patterns with respect to the plurality of pieces of first scrambled information by the first method, so as to generate the plurality of pieces of second scrambled information". The first storage section 801, the parity generation section 1203, and the addition section 1204 together act as the "encoded information generation section for supplying the plurality of pieces of second scrambled information with the plurality of second parities, so as to generate the plurality of pieces of second encoded information". However, the elements included in the information encoding apparatus according to the present invention are not limited to the above.

The information re-encoding apparatus according to the present invention may have any structure as long as including elements acting as the "third scrambling pattern generation section for performing an arithmetic operation on the plurality of first scrambling patterns with respect to the plurality of second scrambling patterns by a second method, so as to generate a plurality of third scrambling patterns", the "scrambled information generation section for performing an arithmetic operation on the plurality of third scrambling patterns with respect to the plurality of pieces of first scrambled information by the first method, so as to generate the plurality of pieces of second scrambled information", and the "encoded information generation section for supplying the plurality of pieces of second scrambled information with the plurality of second parities, so as to generate the plurality of pieces of second encoded information".

According to an information encoding apparatus of the present invention, to each of N pieces of information, one corresponding scrambling pattern among M scrambling patterns (N>M≧1; where M and N are each an integer) is applied. Thus, N pieces of scrambled information are generated. Each of at least one of the M scrambling patterns is applied to two or more of the N pieces of information.

Accordingly, it is sufficient to generate M scrambling patterns for N pieces of information. It is not necessary to generate N scrambling patterns.

As a result, the number of times that the scrambling patterns need to be generated can be reduced, and thus the time required for generating scrambling patterns can be shortened.

According to an information re-encoding apparatus of the present invention, an arithmetic operation is performed on a plurality of first scrambling patterns with respect to a plurality of second scrambling patterns by a second method. Thus, a plurality of third scrambling patterns are generated. An arithmetic operation is performed on a plurality of third scrambling patterns with respect to a plurality of first scrambling patterns by a first method. Thus, a plurality of pieces of second scrambled information are generated. The arithmetic operations performed by the first method and the second method fulfill (A∘B) ●B=A. The symbol "∘" represents a first operator representing the arithmetic operation to be performed by the first method, and the symbol "●" represents a second operator representing the arithmetic operation to be performed by the second method. Information A and information B represent an arbitrary value.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An information encoding apparatus for encoding N pieces of information, the information encoding apparatus comprising:
   a scrambling pattern generation section for generating M scrambling patterns (N>M≧1; where M and N are each an integer);
   a scrambled information generation section for applying, to each of the N pieces of information, one corresponding scrambling pattern among the M scrambling patterns so as to generate N pieces of scrambled information; and
   an encoded information generation section for supplying the N pieces of scrambled information with N parities, respectively, so as to generate encoded information;
   wherein each of at least one of the M scrambling patterns is applied to two or more of the N pieces of information.

2. An information encoding apparatus according to claim 1, wherein the M is a divisor of N, and the scrambled information generation section applies one corresponding scrambling pattern among the M scrambling patterns to each of the N pieces of information such that the M scrambling patterns are repeated N/M times, so as to generate the N pieces of scrambled information.

3. An information encoding apparatus according to claim 1, further comprising a first storage section for storing the N pieces of scrambled information and the N parities in order to supply the N pieces of scrambled information with the N parities.

4. An information encoding apparatus according to claim 1, further comprising a second storage section for storing the M scrambling patterns.

5. An information encoding apparatus according to claim 1, wherein the encoded information generation section is a division circuit.

6. An information encoding apparatus according to claim 1, wherein the encoded information generation section generates the N parities by erasure correction.

7. An information encoding apparatus according to claim 1, wherein N is 32 and M is 1.

8. An information encoding method for encoding N pieces of information, the information encoding method comprising the steps of:
   (a) generating M scrambling patterns (N>M≧1; where M and N are each an integer);
   (b) applying, to each of the N pieces of information, one corresponding scrambling pattern among the M scrambling patterns, thereby generating N pieces of scrambled information; and
   (c) supplying the N pieces of scrambled information with N parities, respectively, thereby generating encoded information;
   wherein each of at least one of the M scrambling patterns is applied to two or more of the N pieces of information.

9. An information encoding method according to claim 8, wherein the M is a divisor of N, and step (b) includes the step of applying one corresponding scrambling pattern among the M scrambling patterns to each of the N pieces of information such that the M scrambling patterns are repeated N/M times, thereby generating the N pieces of scrambled information.

10. An information encoding method according to claim 8, further comprising the step of storing the N pieces of scrambled information and the N parities in order to supply the N pieces of scrambled information with the N parities.

11. An information encoding method according to claim 8, further comprising the step of storing the M scrambling patterns.

12. An information encoding method according to claim 8, wherein step (c) includes the step of generating the N panties by division.

13. An information encoding method according to claim 8, wherein step (c) includes the step of generating the N panties by erasure correction.

14. An information encoding method according to claim 8, wherein N is 32 and M is 1.

15. An information re-encoding apparatus for re-encoding a plurality of pieces of first encoded information into a plurality of pieces of second encoded information, wherein:
   the plurality of pieces of first encoded information include a plurality of first scrambled information scrambled by performing an arithmetic operation on a plurality of first scrambling patterns with respect to a plurality of pieces of information by a first arithmetic operation;
   the plurality of pieces of second encoded information include a plurality of pieces of second scrambled information scrambled by performing an arithmetic operation on a plurality of second scrambling patterns with respect to the plurality of pieces of information by the first arithmetic operation, and a plurality of second parities.
   the information re-encoding apparatus comprising:
   a third scrambling pattern generation section for performing an arithmetic operation on the plurality of first scrambling patterns with respect to the plurality of second scrambling patterns by a second arithmetic operation, so as to generate a plurality of third scrambling patterns;
   a scrambled information generation section for performing an arithmetic operation on the plurality of third scrambling patterns with respect to the plurality of pieces of first scrambled information by the first arithmetic operation, so as to generate the plurality of pieces of second scrambled information; and
   an encoded information generation section for supplying the plurality of pieces of second scrambled information with the plurality of second parities, so as to generate the plurality of pieces of second encoded information;
   wherein the arithmetic operations performed by the first arithmetic operation and the second arithmetic operation fulfill (A∘B)●B=A, where ∘ represents a first operator representing the arithmetic operation to be performed by the first arithmetic operation, the ● represents a second operator representing the arithmetic operation to be performed by the second arithmetic operation, and A and B each represent an arbitrary value.

16. An information re-encoding apparatus according to claim 15, further comprising a first storage section for storing the plurality of pieces of second scrambled information and the plurality of second parities in order to supply the plurality of pieces of second scrambled information with the plurality of second parities.

17. An information re-encoding apparatus according to claim 15, further comprising a second storage section for storing the plurality of third scrambling patterns and the plurality of third parities.

18. An information re-encoding apparatus according to claim 15, wherein:

the plurality of pieces of first encoded information include a plurality of first parities; and the encoded information generation section includes:

a third parity generation section for generating a plurality of third parities in correspondence with the plurality of third scrambling patterns; and a second parity generation section for performing an arithmetic operation on the plurality of third parities with respect to the plurality of first parities by the first arithmetic operation, so as to generate the plurality of second parities.

19. An information re-encoding apparatus according to claim 18, wherein the third parity generation section is a division circuit.

20. An information re-encoding apparatus according to claim 18, wherein the third parity generation section generates the plurality of third parities by erasure correction.

21. An information re-encoding apparatus according to claim 18, wherein:

the plurality of pieces of first scrambled information are N pieces of information, the plurality of third scrambling patterns are M pieces of information ($N>M \geq 1$; M and N are each an integer; and M is a divisor of N), the plurality of first parities are N pieces of information, and the plurality of third parities are M pieces of information;

the scrambled information generation section performs an arithmetic operation on one corresponding third scrambling pattern among the plurality of third scrambling patterns with respect to each of the plurality of pieces of first scrambled information by the first arithmetic operation, such that the plurality of third scrambling patterns are repeated N/M times, so as to generate N pieces of second scrambled information; and the second parity generation section performs an arithmetic operation on one corresponding third parity among the plurality of third parities with respect to each of the plurality of first parities by the first arithmetic operation, such that the plurality of third parities are repeated N/M times, so as to generate N pieces of second parities.

22. An information re-encoding apparatus according to claim 21, wherein N is 32 and M is 2.

23. An information re-encoding method for re-encoding a plurality of pieces of first encoded information into a plurality of pieces of second encoded information, wherein:

the plurality of pieces of first encoded information include a plurality of first scrambled information scrambled by performing an arithmetic operation on a plurality of first scrambling patterns with respect to a plurality of pieces of information by a first arithmetic operation;

the plurality of pieces of second encoded information include a plurality of pieces of second scrambled information scrambled by performing an arithmetic operation on a plurality of second scrambling patterns with respect to the plurality of pieces of information by the first arithmetic operation, and a plurality of second parities, the information re-encoding method comprising the steps of:

(a) performing an arithmetic operation on the plurality of first scrambling patterns with respect to the plurality of second scrambling patterns by a second arithmetic operation, thereby generating a plurality of third scrambling patterns;

(b) performing an arithmetic operation on the plurality of third scrambling patterns with respect to the plurality of pieces of first scrambled information by the first arithmetic operation, thereby generating the plurality of pieces of second scrambled information; and (c) supplying the plurality of pieces of second scrambled information with the plurality of second parities, thereby generating the plurality of pieces of second encoded information;

wherein the arithmetic operations performed by the first arithmetic operation and the second arithmetic operation fulfill $(A \circ B) \bullet B = A$, where $\circ$ represents a first operator representing the arithmetic operation to be performed by the first arithmetic operation, the $\bullet$ represents a second operator representing the arithmetic operation to be performed by the second arithmetic operation, and A and B each represent an arbitrary value.

24. An information re-encoding method according to claim 23, further comprising the step of storing the plurality of pieces of second scrambled information and the plurality of second parities in order to supply the plurality of pieces of second scrambled information with the plurality of second parities.

25. An information re-encoding method according to claim 23, further comprising the step of storing the plurality of third scrambling patterns and the plurality of third parities.

26. An information re-encoding method according to claim 23, wherein:

the plurality of pieces of first encoded information include a plurality of first parities; and step (c) includes the steps of:

(c-1) generating a plurality of third parities in correspondence with the plurality of third scrambling patterns; and (c-2) performing an arithmetic operation on the plurality of third parities with respect to the plurality of first parities by the first arithmetic operation, thereby generating the plurality of second parities.

27. An information re-encoding method according to claim 26, wherein step (c-1) includes the step of generating the plurality of third parities by division.

28. An information re-encoding method according to claim 26, wherein step (c-1) includes the step of generating the plurality of third parities by erasure correction.

29. An information re-encoding method according to claim 26, wherein:

the plurality of pieces of first scrambled information are N pieces of information, the plurality of third scrambling patterns are M pieces of information ($N>M \geq 1$; M and N are each an integer; and M is a divisor of N), the plurality of first parities are N pieces of information, and the plurality of third parities are M pieces of information;

step (b) includes the step of performing an arithmetic operation on one corresponding third scrambling pattern among the plurality of third scrambling patterns with respect to each of the plurality of pieces of first scrambled information by the first arithmetic operation, such that the plurality of third scrambling patterns are repeated N/M times, thereby generating N pieces of second scrambled information; and step (c-2) includes the step of performing an arithmetic operation on one corresponding third parity among the plurality of third parities with respect to each of the plurality of first parities by the first arithmetic operation, such that the plurality of third parities are repeated N/M times, thereby generating N pieces of second parities.

30. An information re-encoding method according to claim 29, wherein N is 32 and M is 2.

* * * * *

UNITED STATES PATENT AND TRADEMARK OFFICE
CERTIFICATE OF CORRECTION

PATENT NO. : 6,950,039 B2
DATED : September 27, 2005
INVENTOR(S) : Yoshikazu Yamamoto, Hisae Tanaka and Motoshi Ito It is certified that error appears in the above-identified patent and that said Letters Patent is hereby corrected as shown below:

Title page,
Item [73], Assignee, "(KR)" should read -- (JP) --.

Column 26,
Lines 10 and 13, "panties" should read -- parities --.

Signed and Sealed this

Twenty-eighth Day of February, 2006

JON W. DUDAS
*Director of the United States Patent and Trademark Office*